US010665149B2

(12) United States Patent
Sears et al.

(10) Patent No.: US 10,665,149 B2
(45) Date of Patent: May 26, 2020

(54) TRANSLATING COLOR SELECTOR LAYER FOR DISPLAY RESOLUTION ENHANCEMENT

(71) Applicant: Facebook Technologies, LLC, Menlo Park, CA (US)

(72) Inventors: Jasmine Soria Sears, Redmond, WA (US); James Ronald Bonar, Redmond, WA (US); Stephen John Holmes, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 11 days.

(21) Appl. No.: 15/954,091

(22) Filed: Apr. 16, 2018

(65) Prior Publication Data

US 2019/0318678 A1    Oct. 17, 2019

(51) Int. Cl.
*G09G 3/20* (2006.01)
*G09G 3/34* (2006.01)
*G09G 3/36* (2006.01)
*G02F 1/1335* (2006.01)

(52) U.S. Cl.
CPC ......... *G09G 3/2003* (2013.01); *G09G 3/3493* (2013.01); *G09G 3/3607* (2013.01); *G02F 1/133514* (2013.01); *G09G 3/346* (2013.01); *G09G 2300/0452* (2013.01); *G09G 2310/0235* (2013.01); *G09G 2320/064* (2013.01); *G09G 2320/0666* (2013.01)

(58) Field of Classification Search
CPC ......... G09G 2300/0452; G09G 3/3607; G09G 3/2003; G09G 3/3208; G09G 2300/023; G09G 2310/0235; G09G 2320/0209; G09G 2320/0646; G09G 3/003; G09G 3/348; G09G 3/3433; G09G 2340/0457; G09G 2340/04; G02F 1/29; H04N 9/3114
See application file for complete search history.

(56) References Cited

U.S. PATENT DOCUMENTS

| | | | | |
|---|---|---|---|---|
| 5,450,222 | A * | 9/1995 | Sirkin | G02F 1/1347 349/150 |
| 2009/0116107 | A1* | 5/2009 | Kindler | G02B 26/123 359/457 |
| 2009/0167657 | A1* | 7/2009 | Tomizawa | G09G 3/2003 345/88 |
| 2015/0187301 | A1* | 7/2015 | Yoon | G09G 3/36 345/88 |
| 2015/0371605 | A1* | 12/2015 | Wu | G09G 5/02 345/604 |
| 2017/0221266 | A1* | 8/2017 | Schubert | G06T 3/4076 |
| 2018/0130400 | A1* | 5/2018 | Meitl | G09G 3/007 |
| 2018/0190747 | A1* | 7/2018 | Son | G06F 3/1446 |

* cited by examiner

*Primary Examiner* — Sanjiv D. Patel
(74) *Attorney, Agent, or Firm* — FisherBroyles, LLP

(57) ABSTRACT

A display device may include (1) a light-emitting layer having a plurality of light-emitting regions, with at least some of the light-emitting regions operable to emit a varying, controlled intensity of light at a fixed location, (2) a color selector layer disposed over the plurality of light-emitting regions, the color selector layer having at least one group of color selectors, and (3) an actuator operable to move the color selector layer relative to the light-emitting layer. The movement of the color selector layer may result in each color selector of the at least one group of color selectors passing each fixed location. Various other apparatus, systems, and methods are also disclosed.

24 Claims, 15 Drawing Sheets

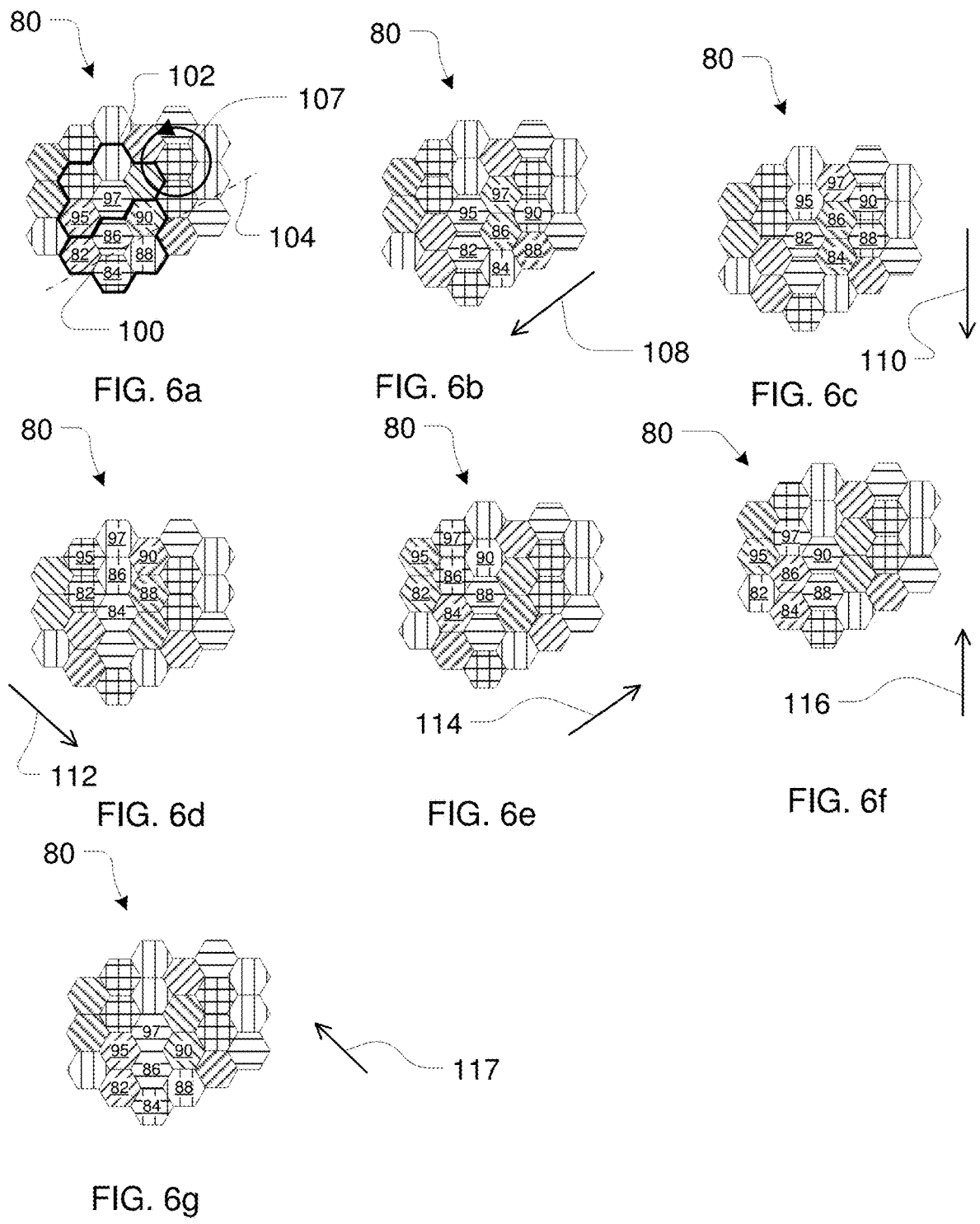

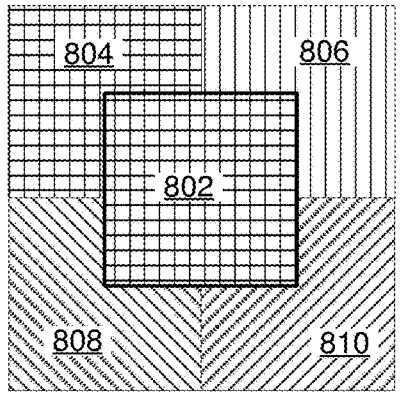
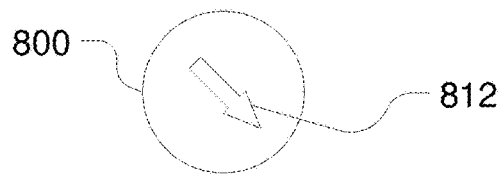
FIG. 8a
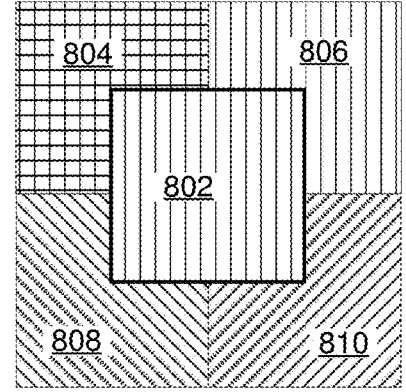
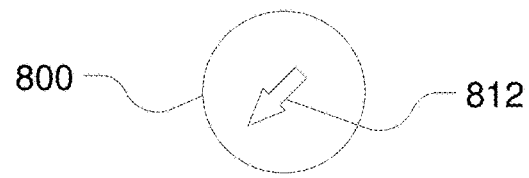
FIG. 8b
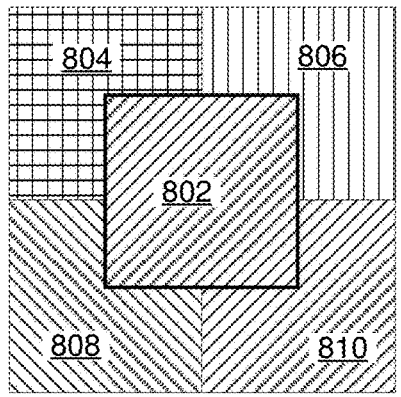
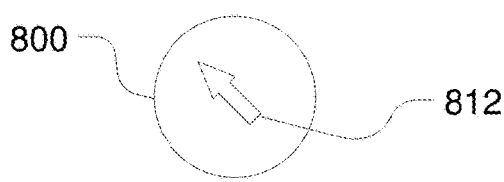
FIG. 8c
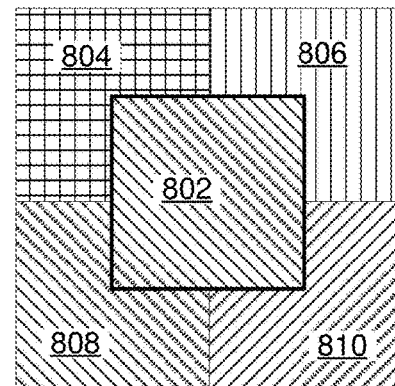
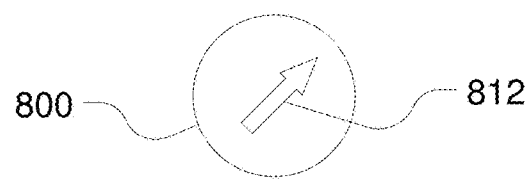
FIG. 8d

TRANSLATING COLOR SELECTOR LAYER FOR DISPLAY RESOLUTION ENHANCEMENT

BACKGROUND

Emissive displays produce images made up of many pixels. Such displays commonly control the color and brightness of each pixel to present an image. A pixel is in turn often composed of multiple sub-pixels of different colors. The human eye typically does not perceive a sub-pixel individually. Instead the eye blends the sub-pixels together producing the impression of a single uniform pixel. The color and brightness of a pixel may be controlled by varying the brightness of the underlying sub-pixels. For example, the underlying sub-pixels may produce a white pixel by illuminating with equal intensity. The underlying sub-pixels may produce different pixel colors by changing their relative brightness. The size of the single uniform pixel, which determines the resolution of a display, is typically equal to the sum of the sizes of its constituent sub-pixels and or the smallest feature that a display can resolve.

Display manufacturers may select sub-pixels colors to coincide with the cone cells of the human eye. Cone cells are primarily sensitive to red, blue, or green light. Accordingly, most displays implement sub-pixels of red, blue, and green emitters. These three colors may be combined to span a range of perceivable colors while minimizing the size of a pixel. However, such pixels are often unable to reproduce colors with a wavelength greater than that of the red sub-pixel or a wavelength less than that of the blue sub-pixel. A display may produce colors outside of these color ranges using additional sub-pixels, at the cost of increasing the individual pixel size and loss of resolution.

SUMMARY

As will be described in greater detail below, the instant disclosure describes a novel sub-pixel layout enabling spatial, linear temporal, and circular sub-pixel averaging with a single display.

In one example, a display device may include (1) a light-emitting layer having a plurality of light-emitting regions, at least some of the plurality of light-emitting regions operable to emit a varying, controlled intensity of light at a fixed location, (2) a color selector layer disposed over the plurality of light-emitting regions, the color selector layer having at least one group of color selectors, and (3) an actuator operable to move the color selector layer relative to the light-emitting layer. The movement of the color selector layer may result in each color selector of the at least one group of color selectors passing each fixed location.

According to some embodiments, (1) the light-emitting regions may be spaced at a regular interval, (2) the at least one group of color selectors may include a plurality of groups of color selectors, and (3) the color selectors may be spaced at the regular intervals. In some examples, the actuator may be operable to move the color selector layer such that each color selector of a group of color selectors passes over a light emitting region for the same period of time. In some examples, each light-emitting region of the light-emitting layer may emit a white light. In this example, at least one of the color selectors may include at least one of a pigmented material or a dichroic band-pass filter. In at least one example, each light-emitting region of the light-emitting layer may emit at least one of a blue light or an ultraviolet light. In this example, at least one of the color selectors may include at least one of a phosphor, a quantum dot, or a metallic nanoparticle.

In at least one example, the light-emitting regions may be arranged in linear rows of N elements, each color selector group may contain M color selectors, and the color selectors may be arranged in linear rows of at least N+(X*M)−1 elements, where X is a positive integer. In some examples, the actuator may include at least one of a piezoelectric material or a microelectromechanical systems actuator. Additionally or alternatively, the actuator may be operable to move the color selector layer at least one of laterally, linearly, circularly, or rotationally relative to the light-emitting layer. In various examples, the actuator may be operable to move the color selector layer in a direction parallel to a surface of the light-emitting layer. In at least one example, the light-emitting layer may include a liquid crystal layer and the color selector layer may be adjacent the liquid crystal layer. In at least one example, each light-emitting region may include an organic light-emitting diode and the color selector layer may be adjacent the organic light-emitting diodes.

In addition, a corresponding head-mounted-display apparatus may include (1) a body and (2) a display system housed in the body. The display system may include (1) a light-emitting layer having a plurality of light-emitting regions, wherein at least some of the plurality of light-emitting regions are operable to emit a varying, controlled intensity of light at a respective fixed location, (2) a color selector layer disposed over the plurality of light-emitting regions, the color selector layer having at least one group of color selectors, and (3) an actuator operable to move the color selector layer relative to the light-emitting layer. The movement of the color selector layer may result in each color selector of the at least one group of color selectors passing each fixed location. In at least one example, at least one of the color selectors may include at least one of a color filter or a color converting material.

In some embodiments, a method may include (1) emitting a first controlled intensity of light associated with a first color selector type of a color selector layer at a fixed location of a display device with the first color selector type positioned over the fixed location, (2) moving the color selector layer relative to the fixed location to position a second color selector type of the color selector layer over the fixed location, and (3) emitting a second controlled intensity of light associated with the second color selector type at the fixed location.

According to some embodiments, the first controlled intensity of light and the second controlled intensity of light are emitted over a predefined period of time such that light passing through the first color selector type and the second color selector type perceptually combine to appear as a specified color. In some examples, the specified color may correspond to an instruction for displaying an image.

In at least one embodiment, the method may further include (1) moving the color selector layer relative to the fixed location to position a third color selector type of the color selector layer over the fixed location, and (2) emitting a third controlled intensity of light associated with the third color selector type at the fixed location. In this example, the method may further include (1) moving the color selector layer relative to the fixed location to position a fourth color selector type of the color selector layer over the fixed location and (2) emitting a fourth controlled intensity of light associated with the fourth color selector type at the fixed location. Additionally, the method may further include (1) moving the color selector layer relative to the fixed location to position a fifth color selector type of the color selector layer over the fixed location and (2) emitting a fifth controlled intensity of light associated with the fifth color selector type at the fixed location.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6a is a front view of the sub-pixel layout of FIG. 5a in accordance with some embodiments.

FIG. 6b is a front view of the sub-pixel layout of FIG. 6a translated by one sub-pixel in accordance with some embodiments.

FIG. 6c is a front view of the sub-pixel layout of FIG. 6b translated by one sub-pixel in accordance with some embodiments.

FIG. 6d is a front view of the sub-pixel layout of FIG. 6c translated by one sub-pixel in accordance with some embodiments.

FIG. 6e is a front view of the sub-pixel layout of FIG. 6d translated by one sub-pixel in accordance with some embodiments.

FIG. 6f is a front view of the sub-pixel layout of FIG. 6e translated by one sub-pixel in accordance with some embodiments.

FIG. 6g is a front view of the sub-pixel layout of FIG. 6f translated by one sub-pixel in accordance with some embodiments.

FIG. 8a is a front view of an example rotating prism disposed over light-emitting regions and causing a fixed location to display multiple sub-pixel types in accordance with some embodiments.

FIG. 8b is a continuation of the example of FIG. 8a in accordance with some embodiments.

FIG. 8c is a continuation of the example of FIG. 8a in accordance with some embodiments.

FIG. 8d is a continuation of the example of FIG. 8a in accordance with some embodiments.

Figure 1:
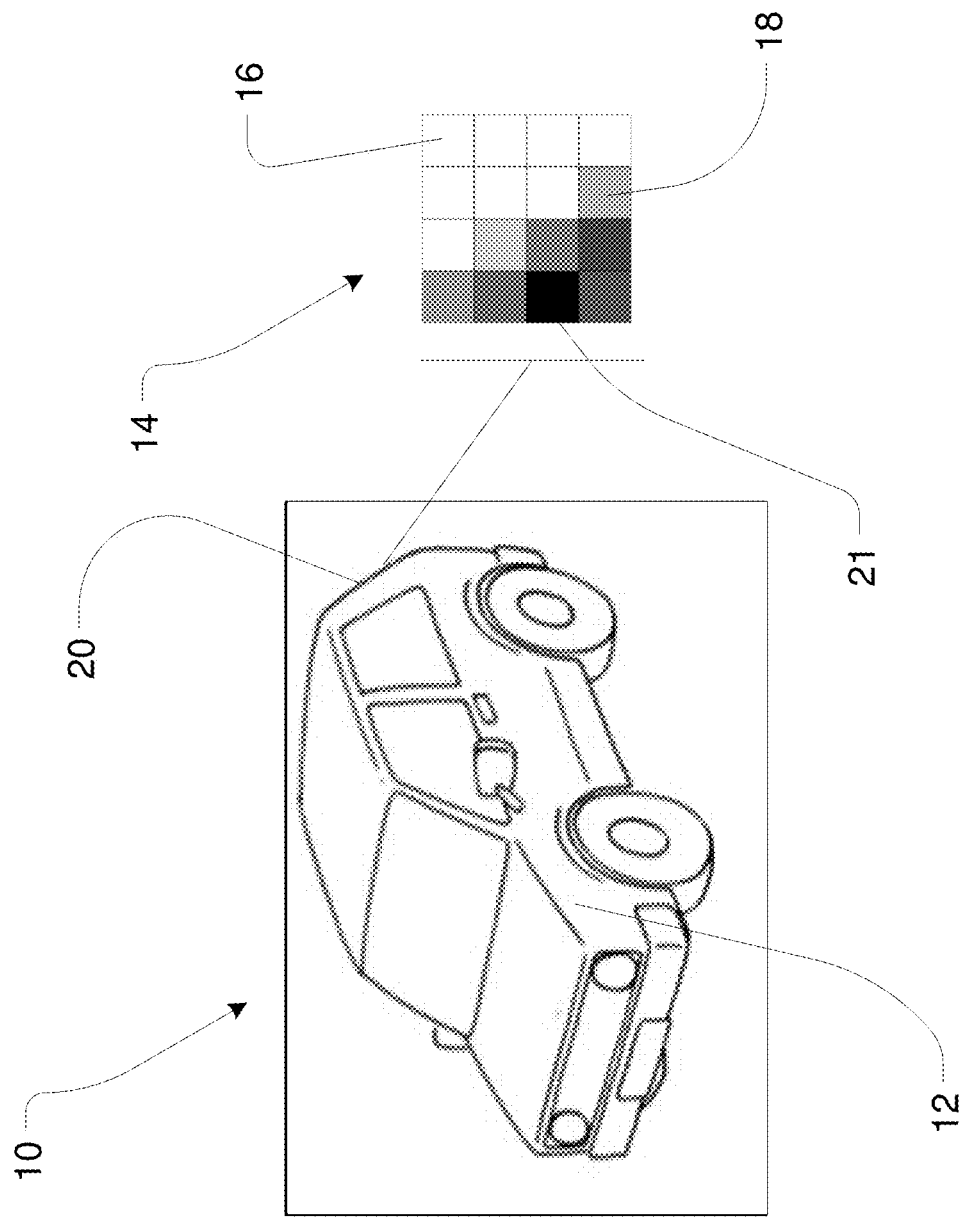
FIG. 1 is a front view of an example monitor screen with a detailed view of an underlying pixel structure in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for displaying images with emissive display devices. As will be explained in greater detail below, embodiments of the instant disclosure may include an emissive display device utilized in a combination with a computing device. The emissive display device, may include, for example an external monitor, a built-in monitor, a game display, a head mounted display, or other display using colored sub-pixels. The emissive display device may include a sub-pixel layout having a plurality of spatial pixels that each include at least four sub-pixel types of three or more different colors arranged in selected linear paths, circular or substantially circular paths, and/or any other suitable paths (e.g., rectangular paths, square paths, hexagonal paths, etc.). In some embodiments, the emissive display device may include a light-emitting layer and a color selector layer (e.g., a color filter layer, a color converting emissive layer, etc.) that may be moved parallel relative to the light-emitting layer by an actuator.

The described displays and sub-pixel arrangements may allow for spatial, linear temporal, circular temporal, and/or any other suitable temporal sub-pixel averaging. Each pixel may include sub-pixels that are operable to emit a white light when illuminated together. Each color of sub-pixel may further lie on a linear path such that a linear translation will allow each color sub-pixel to appear in the same location. Furthermore, each color of sub-pixel may lie on a circular path such that a circular translation will allow each color sub-pixel to appear in the same location. In some examples, a color selector layer may move while the light source remains stationary.

Figure 2:
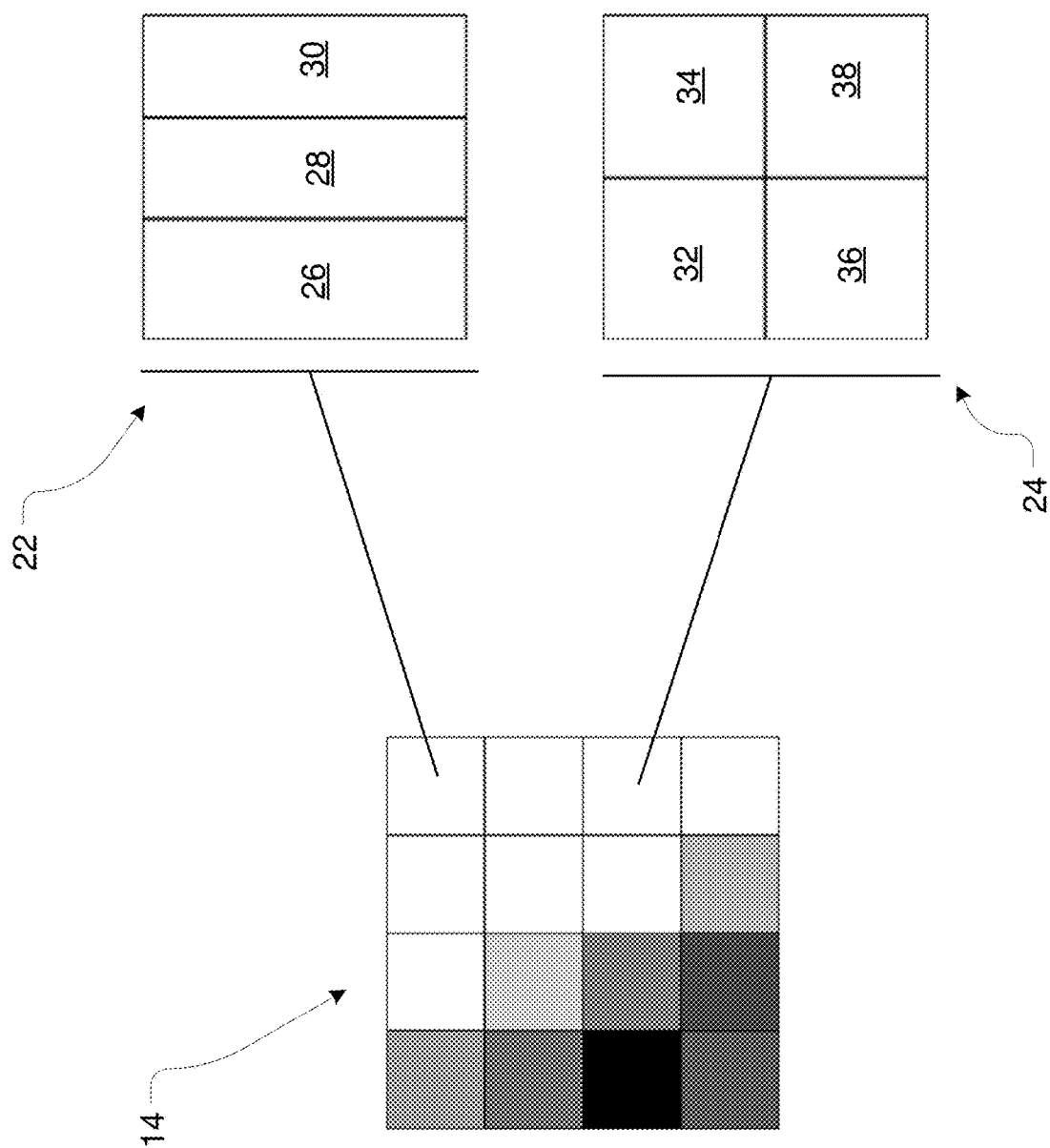
FIG. 2 is a front view of the underlying pixel structure of FIG. 1 and a detailed view of exemplary sub-pixels structures in accordance with some embodiments.

The following will provide, with reference to FIG. 1, an overview of the use of pixels to render an image and, with reference to FIG. 2, examples of the use of sub-pixels to render a color in a display. Further provided is a description of a first sub-pixel layout in connection with FIGS. 3a to 4d, and a description of a second sub-pixel layout in connection with FIGS. 5a to 6g. Additionally, descriptions of rotating prisms for altering sub-pixel light paths are provided in association with FIGS. 7-8d. Further provided, in association with FIGS. 9a to 12, are descriptions of display apparatuses and systems. In addition, the discussion corresponding to FIGS. 13 and 14 will provide examples of exemplary methods.

FIG. 1 illustrates schematically an example of an emissive display device 10 rendering an image 12 of a car. Image 12 may appear to be an unbroken image to the naked eye, but when enlarged, as shown in enlarged view 14, it is apparent that image 12 is formed of many pixels. Emissive display device 10 may control individual pixels and selectively illuminate individual pixels in a pattern to form image 12. For example, emissive display device 10 may fully illuminate a first pixel 16 to display a white background, while partially illuminating a second pixel 18 to form an edge of a line 20. Emissive display device 10 may darken a third pixel 21 to form a black pixel corresponding to line 20. At normal viewing distances, pixels may blend together to form image 12 of the car as shown on the left of FIG. 1.

Display device 10 may include any suitable emissive display technology. For example, display device 10 may include image pixels formed of light-emitting diodes (LEDs), organic light-emitting diodes (OLEDs), plasma cells, electrophoretic display elements, liquid crystal display (LCD) components, electrowetting display elements, cathode ray tube (CRT elements), and/or any other suitable image pixel technology. Pixels may each produce a range of brightness and color for the emissive display device 10. In some embodiments, a single emissive element may not display more than a single color, and therefore, multiple emissive elements may be used to produce each color pixel, with the size of a display pixel being equal to the sum of the sizes of its constituent sub-pixels.

FIG. 2 illustrates enlarged view 14 of FIG. 1 and further illustrates example arrangements 22, 24 of sub-pixels that form colored pixels. A sub-pixel may emit a specific color of light, which blends with other sub-pixels to form a variable pixel color. By controlling the relative intensity of each specific color of light, the sub-pixels may produce a new, blended color. When emissive display device 10 illuminates no sub-pixels of a pixel, the pixel may appear darkened and/or may be black. When emissive display device 10 illuminates each sub-pixel evenly, the pixel may appear white.

First sub-pixel arrangement 22 shown in FIG. 2 includes three sub-pixels 26, 28, 30, in accordance with some embodiments. FIG. 2 depicts sub-pixels 26, 28, 30 as being equal in size, but they need not be. For example, the human eye may be less sensitive to blue light and a blue sub-pixel may be enlarged to compensate for the difference in sensitivity. In this example, first sub-pixel arrangement 22 may include a blue sub-pixel 26, a red sub-pixel 28, and a green sub-pixel 30 that respectively emit blue, red, and green wavelengths of light. The colors of the sub-pixels may generally correspond to sensitivities of corresponding cones of the human eye. Additionally or alternatively, sub-pixels of first sub-pixel arrangement 22 may emit any other suitable visible light colors, including, for example, cyan, magenta, violet, and/or white light.

A second sub-pixel arrangement 24 shown in FIG. 2 includes four sub-pixels 32, 34, 36, 38, according to at least one embodiment. Like the previously described first sub-pixel arrangement 22, second sub-pixel arrangement 24 may include a blue sub-pixel 32, a red sub-pixel 34, and a green sub-pixel 36. In addition to these three sub-pixels 32, 34, 36, second sub-pixel arrangement 24 may further include a second blue sub-pixel 38. In place of striped sub-pixels of different sizes illustrated in first sub-pixel arrangement 22, second blue sub-pixel 38 may compensate for the varying sensitivity of the human eye.

Emissive display device 10 may be configured to display colors having a wavelength between red sub-pixels 28, 34, the highest wavelength sub-pixel, and blue sub-pixels 26, 32, 38, the lowest wavelength sub-pixel. This may produce a broad spectrum of colors visible to users since the human eye may be less sensitive to wavelengths outside of this range. In some embodiments, additional sub-pixels may be added to emissive display device 10 to increase the brightness and/or extend the color gamut of the emissive display device 10.

First sub-pixel arrangement 22 and second sub-pixel arrangement 24 are examples of spatial sub-pixel averaging. In some examples, spatial sub-pixel averaging may produce colors visible to a user by using sub-pixels in close spatial proximity to enable a pixel to appear to emit a single, variable color. In some embodiments, variable colors may be produced in an emissive display device using temporal sub-pixel averaging. Temporal sub-pixel averaging may produce colors visible to a user by emitting multiple colors of light from a single sub-pixel location at different moments in time in rapid succession. The human eye may perceive the rapidly changing colors as a single color emitted from the sub-pixel location. For example, if a sub-pixel location flashes red, green, and blue rapidly, the human eye may perceive the sub-pixel as a white pixel.

According to various embodiments, a sub-pixel layout designed for spatial sub-pixel averaging may include a dense packing of sub-pixels to maximize resolution. The sub-pixel layout may further vary the size and shape of sub-pixels to minimize the sum of the sub-pixel areas that make up a single pixel. Layout optimization for temporal sub-pixel averaging, as described herein, may result in very different sub-pixel layouts compared to spatial sub-pixel averaging. When optimizing for temporal sub-pixel averaging, a sub-pixel may be the same size, shape, and orientation as every other sub-pixel. This may allow for effective spatial overlap of sub-pixels through simple translation of the optical path or color-selecting layer, without the need for rotation or other transformations which require more complex mechanisms. In addition, straight lines may exist along which every sub-pixel color can be found with minimal unused space or repetition to allow full color overlap via translation along a single axis. For example, the linear path may be contiguous with one of each sub-pixel. In some examples, contiguous objects or regions may have a common border or may be adjacent or touching one another. For example, a contiguous path of sub-pixels may include each sub-pixel with no additional sub-pixels in the path between the sub-pixels. Similarly, circular paths, substantially circular paths, and/or other circuitous paths (e.g., rectangular paths, hexagonal paths, etc.) may exist along which every sub-pixel color can be found with minimal unused space or repetition. For example, a circular path may not have a diameter greater than the sum of the widths of the sub-pixels of every sub-pixel color. In some examples, the width and size of a sub-pixel may refer to the spacing between centers of a sub-pixel. In some examples, the actual width and/or size of a light-emitting element of a sub-pixel may be less than the spacing of the sub-pixels.

FIGS. 3a-d illustrate an embodiment of a sub-pixel layout 40 suitable for spatial sub-pixel averaging and temporal sub-pixel averaging. Sub-pixel layout 40 includes both contiguous straight lines and circular or substantially circular paths along which every sub-pixel type may be found. It may be advantageous to have a linear path and a circular or substantially circular path because the same sub-pixel layout may be used for either linear or circular temporal averaging. In addition to having both a linear and a circular path pattern, sub-pixel layout 40 may further include spatial pixels 41, 43 for spatial sub-pixel averaging at a reduced resolution. For example, temporal sub-pixel averaging may be used for added detail, while a display device may fall back to spatial sub-pixel averaging to conserve resources and power. Both types of sub-pixel averaging are compatible with the sub-pixel layout of FIG. 3.

Figure 3A:
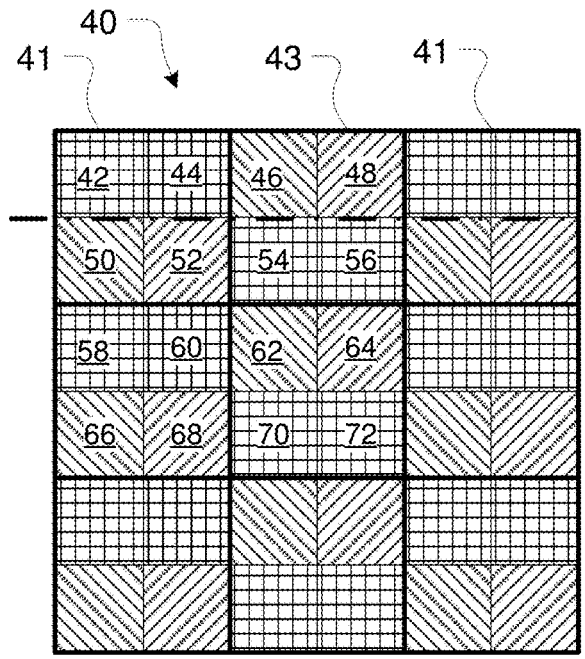
FIG. 3a is a front view of an example sub-pixel layout suitable for spatial, linear temporal, and circular temporal sub-pixel averaging in accordance with some embodiments.

Sub-pixel layout 40 includes, for example, four sub-pixel types with each of the four sub-pixel types corresponding to a relative positional relationship and/or orientation in a spatial pixel (e.g., spatial pixel 41 and/or 43). Each of the four sub-pixel types of sub-pixel layout 40 may be represented by either a first pattern as shown on sub-pixel locations 42 and 44 in FIG. 3a, a second pattern as shown on sub-pixel location 46 in FIG. 3a, or a third pattern as shown on sub-pixel location 48 in FIG. 3a. For example, the first pattern may correspond to sub-pixel types that emit a blue color, the second pattern may correspond to sub-pixel types that emit a green color, and the third pattern may correspond to sub-pixel types that emit a red color. While FIG. 3a illustrates a sub-pixel layout having four different sub-pixel types with one color appearing twice, in other examples, a sub-pixel layout may include four sub-pixel types that each include a different one of four different colors (see, e.g., FIGS. 4a-4d and 8a-8d). Sub-pixel layout 40 includes two spatial pixels 41, 43 having arrangements of sub-pixel types that repeat in a regular pattern. Spatial pixel 43 is a mirror image of spatial pixel 41 mirrored about symmetry line 45. In a direction parallel to symmetry line 45, spatial pixels 41, 43 may be arranged in rows, with first spatial pixel 41 alternating with second spatial pixel 43 such that every other spatial pixel is first spatial pixel 41.

Sub-pixel layout 40 may be suitable for use as a spatial sub-pixel display with spatial pixels 41, 43. In the example of FIG. 3a, each spatial pixel 41, 43 has four sub-pixels that may be variably combined to emit a full range of color. Sub-pixel layout 40 illustrated in FIG. 3a includes three rows of three spatial pixels 41, 43 for a total of nine spatial pixels. In actual usage, the number of spatial pixels would be much higher, but the design would remain the same with the repeating pattern of alternating spatial pixels 41, 43.

Linear temporal averaging of sub-pixel layout 40 will now be described in relation to sub-pixel locations 42-72. A sub-pixel location may remain fixed in relation to an observer. However, the sub-pixel type appearing in each position may vary in time with each figure showing a different time frame in which the sub-pixel layout 40 has been moved. The relative intensity of a sub-pixel type at that moment in time will determine the color perceived at that location. As previously described, a display device may vary the perceived location of a sub-pixel type by changing a light path to direct an emissive pixel to a location, the display device itself may move, and/or a movable color selector may move over a fixed light source region as will be described in greater detail later in relation to FIG. 6a to FIG. 9d.

Figure 3B:
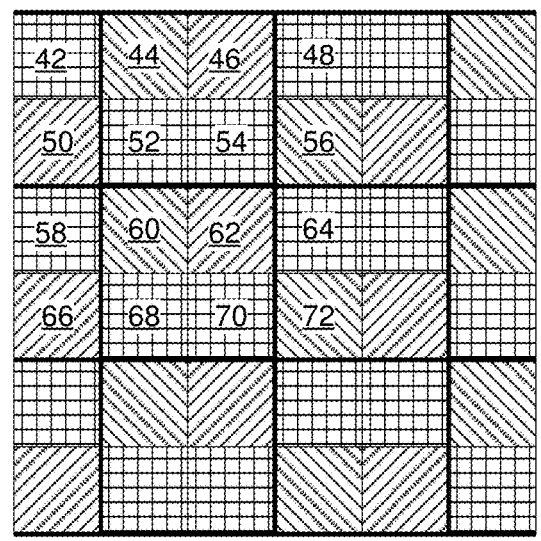
FIG. 3b is a front view of the sub-pixel layout of FIG. 3a linearly translated by one sub-pixel in accordance with some embodiments.
Figure 3C:
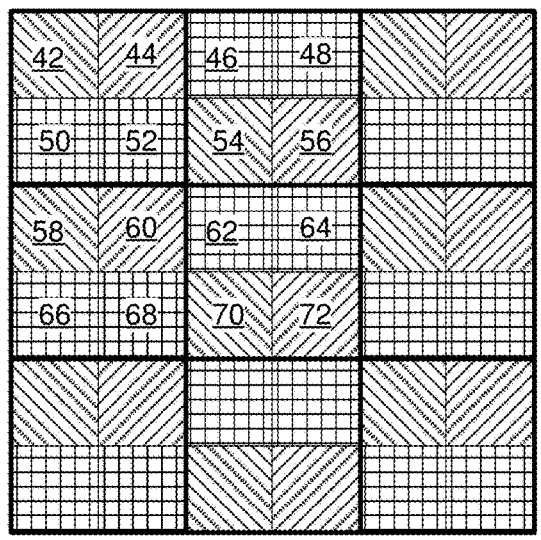
FIG. 3c is a front view of the sub-pixel layout of FIG. 3b linearly translated by one sub-pixel in accordance with some embodiments.
Figure 3D:
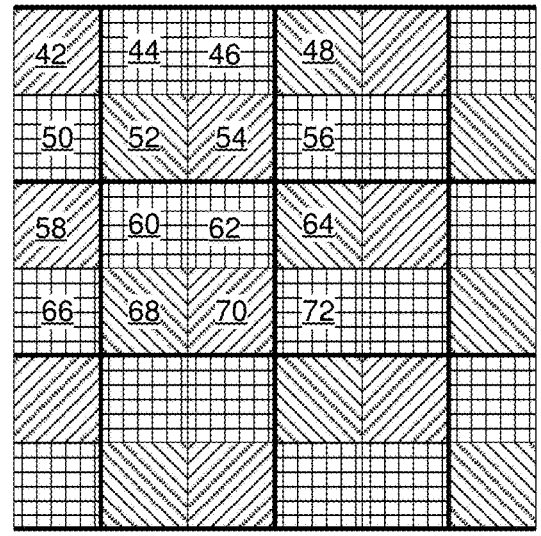
FIG. 3d is a front view of the sub-pixel layout of FIG. 3c linearly translated by one sub-pixel in accordance with some embodiments.

Initially, sub-pixel layout 40 appears as shown in FIG. 3a, with a first sub-pixel type at sub-pixel locations 42, 54, 58, and 70, a second sub-pixel type at sub-pixel locations 44, 56, 60, and 72, a third sub-pixel type at sub-pixel locations 46, 50, 62, and 66, and a fourth sub-pixel type at sub-pixel locations 48, 52, 64, and 68. In FIG. 3b, the sub-pixel layout 40 has shifted to the left, parallel to symmetry line 45, such that sub-pixel locations 48, 52, 64, and 68 now correspond to the first sub-pixel type, sub-pixel locations 42, 54, 58, and 70 now correspond to the second sub-pixel type, sub-pixel locations 44, 56, 60, and 72 now correspond to the third sub-pixel type, and sub-pixel locations 46, 50, 62, and 66 now correspond to the fourth sub-pixel type. In FIG. 3c the sub-pixel layout 40 has moved one sub-pixel further to the left parallel to symmetry line 45, such that sub-pixel locations 46, 50, 62, and 66 display the first sub-pixel type, sub-pixel locations 48, 52, 64, and 68 display the second sub-pixel type, sub-pixel locations 42, 54, 58, and 70 display the third sub-pixel type, and sub-pixel locations 44, 56, 60, and 72 display the fourth sub-pixel type. In FIG. 3d, the sub-pixel layout 40 has moved one sub-pixel further to the left parallel to symmetry line 45 such that sub-pixel locations 44, 56, 60, and 72 display the first sub-pixel type, sub-pixel locations 46, 50, 62, and 66 display the second sub-pixel type, sub-pixel locations 48, 52, 64, and 68 display the third sub-pixel type, and sub-pixel locations 42, 54, 58, and 70 display the fourth sub-pixel type. Progressing from FIGS. 3a to 3d results in each sub-pixel location displaying each sub-pixel type at different moments in time.

The sub-pixel layout 40 may then continue moving to the left, in which case it returns to arrangement shown in FIG. 3a, or it may begin to move back to the right, reversing its prior course. In either case, the result is that each sub-pixel location displays each sub-pixel type. If the sub-pixel locations change sub-pixel types rapidly, for example at four times the refresh rate of the display device, sub-pixels locations will appear to emit all available colors. In place of the nine spatial pixels of FIG. 3a, temporal sub-pixel design now has thirty-six effective pixels, an increase of four times the resolution while using the same size sub-pixels. The sub-pixel layout illustrated in FIGS. 3a-3d may additionally or alternatively be utilized, for example, in circular temporal averaging in the manner shown in FIGS. 4a-4d.

Figure 4A:
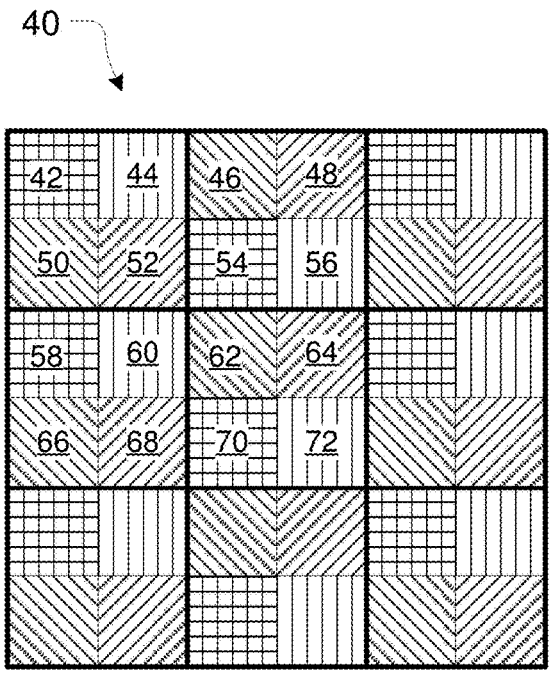
FIG. 4a is a front view of an example sub-pixel layout suitable for spatial, linear temporal, and circular temporal sub-pixel averaging in accordance with some embodiments.
Figure 4B:
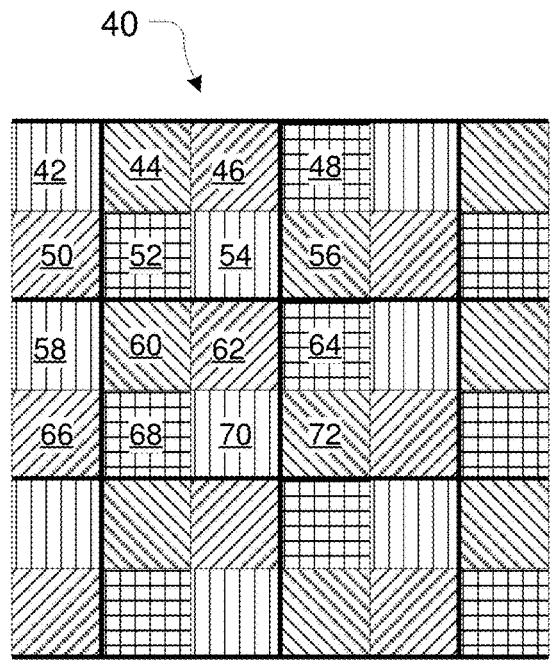
FIG. 4b is a front view of the sub-pixel layout of FIG. 4a translated by one sub-pixel in accordance with some embodiments.
Figure 4C:
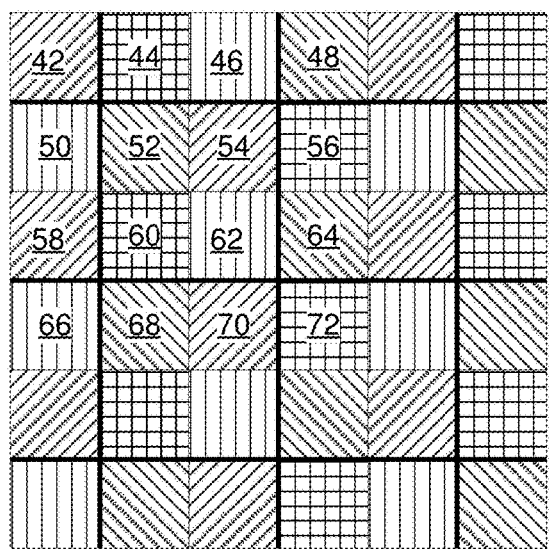
FIG. 4c is a front view of the sub-pixel layout of FIG. 4b translated by one sub-pixel in accordance with some embodiments.
Figure 4D:
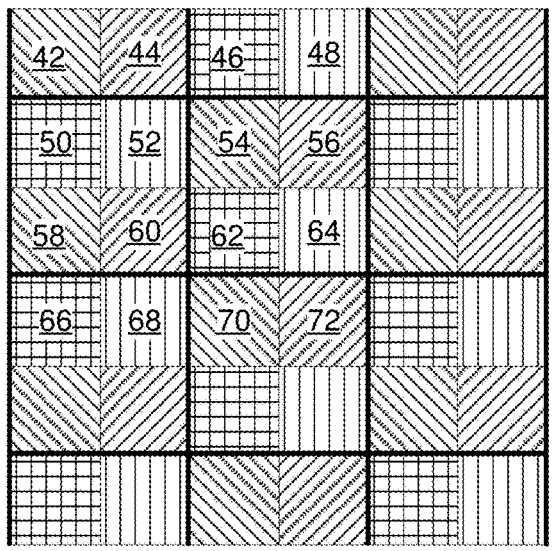
FIG. 4d is a front view of the sub-pixel layout of FIG. 4c translated by one sub-pixel in accordance with some embodiments.

FIG. 4a through FIG. 4d illustrates sub-pixel layout 40, which is similar to that shown in FIGS. 3a-3d, but with four sub-pixel types in each spatial pixel that each correspond to a separate emitted color (e.g., red, green, blue, and yellow) represented by a different pattern. Circular temporal averaging is illustrated in FIGS. 4a-4d, although the sub-pixel layout 40 of FIGS. 4a-4d may additionally or alternatively be utilized, for example, in linear temporal averaging and/or as a spatial sub-pixel display in the manner shown in FIGS. 3a-3d. As shown in FIGS. 4a-4d, In FIG. 4a, sub-pixel layout 40 starts with a first sub-pixel type at sub-pixel locations 42, 54, 58, and 70, a second sub-pixel type at sub-pixel locations 44, 56, 60, and 72, a third sub-pixel type at sub-pixel locations 46, 50, 62, and 66, and a fourth sub-pixel type at sub-pixel locations 48, 52, 64, and 68. In FIG. 4b, the sub-pixel layout 40 has moved one sub-pixel to the left relative to the position of FIG. 4a, such that sub-pixel locations 48, 52, 64, and 68 correspond to the first sub-pixel type, sub-pixel locations 44, 56, 60, and 72 correspond to the second sub-pixel type, sub-pixel locations 44, 56, 60, and 72 correspond to the third sub-pixel type, and sub-pixel locations 46, 50, 62, and 66 correspond to the fourth sub-pixel type. In FIG. 4c, sub-pixel layout 40 has moved up one sub-pixel relative to the position of FIG. 4b, such that sub-pixel locations 44, 56, 60, and 72 correspond to the first sub-pixel type, sub-pixel locations 46, 50, 62, and 66 correspond to the second sub-pixel type, sub-pixel locations 48, 52, 64, and 68 correspond to the third sub-pixel type, and sub-pixel locations 42, 54, 58, and 70 correspond the fourth sub-pixel type. In FIG. 4d, sub-pixel layout 40 has moved to the right one sub-pixel relative to the position of FIG. 4c, such that sub-pixel locations 46, 50, 62, and 66 correspond to the first sub-pixel type, sub-pixel locations 48, 52, 64, and 68 correspond to the second sub-pixel type, sub-pixel locations 42, 54, 58, and 70 correspond to the third sub-pixel type, and sub-pixel locations 44, 56, 60, and 72 correspond to the fourth sub-pixel type. Progressing from FIGS. 4a to 4d results in sub-pixel locations displaying each sub-pixel type.

Sub-pixel layout 40 may then continue moving in a circular or substantially circular orbit, moving down one sub-pixel such that the sub-pixel design returns to the position of FIG. 4a, or it may reverse the pattern. In either case, the result is that each sub-pixel location displays each sub-pixel type during the translation of sub-pixel layout 40. Like the previous example of linear temporal averaging, sub-pixel layout 40 displays thirty-six pixels instead of nine pixels with spatial sub-pixel averaging.

Figure 5A:
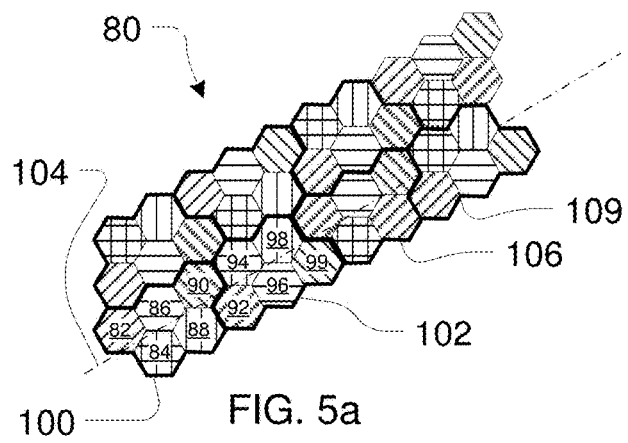
FIG. 5a is a front view of an example sub-pixel layout suitable for spatial, linear temporal, and circular temporal sub-pixel averaging in accordance with some embodiments.

FIG. 5a illustrates a second example of a sub-pixel layout 80 compatible with spatial, linear temporal averaging, and circular temporal averaging in accordance with some embodiments. In this example, sub-pixel layout 80 has five sub-pixel types with a first pattern corresponding to a first sub-pixel type shown in sub-pixel location 82 and sub-pixel location 92, a second pattern corresponding to a second sub-pixel type shown in sub-pixel location 84 and sub-pixel location 94, a third pattern corresponding to a third sub-pixel type shown in sub-pixel location 86 and sub-pixel location 96, a fourth pattern corresponding to a fourth sub-pixel type shown in sub-pixel location 90 and sub-pixel location 99, and a fifth pattern corresponding to a fifth sub-pixel type shown in sub-pixel location 88 and sub-pixel location 98. For example, the first sub-pixel type may be light blue, the second sub-pixel type may be red, the third sub-pixel type may be green, the fourth sub-pixel type may be dark blue, and the fifth sub-pixel type may be yellow. The increased number of sub-pixel types may provide a greater range of color combinations compared to a three-color sub-pixel layout. While each of sub-pixel locations 82-99 are illustrated as having a hexagonal periphery, sub-pixel locations 82-99 may have any other suitable peripheral shape (e.g., a rectangular, square, circular, octagonal, and/or any other suitable shape), without limitation.

Sub-pixel layout 80 includes two different spatial pixels 100, 102 as shown in FIG. 5a. A first spatial pixel 100 shown in FIG. 5a includes sub-pixel locations 82, 84, 86, 88, and 90. A second spatial pixel 102 includes sub-pixel locations 92, 94, 96, 98, and 99. Second spatial pixel 102 is a mirror image of first spatial pixel 100 taken about centerline 104. Sub-pixel layout 80 alternates between first spatial pixel 100 and second spatial pixel 102 in a direction parallel to centerline 104. For example, a third spatial pixel 106 matches first spatial pixel 100 and a fourth spatial pixel 109 matches second spatial pixel 102.

Linear temporal sub-pixel averaging will be described with reference to sub-pixel layout 80 and sub-pixel locations 82, 86, 90, 94, and 98. Sub-pixel locations 82, 86, 90, 94, and 98 lie on a straight path parallel to centerline 104 and are contiguous. FIG. 5a illustrates sub-pixel layout 80 in a first position with sub-pixel location 82 displaying the first sub-pixel type, sub-pixel location 86 displaying the third sub-pixel type, sub-pixel location 90 displaying the fourth sub-pixel type, sub-pixel location 94 displaying the second sub-pixel type, and sub-pixel location 98 displaying the fifth sub-pixel type.

Figure 5B:
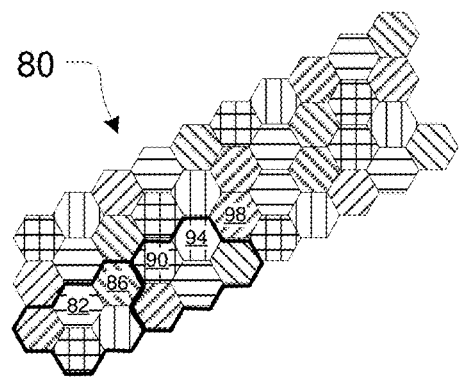
FIG. 5b is a front view of the sub-pixel layout of FIG. 5a translated by one sub-pixel in accordance with some embodiments.
Figure 5C:
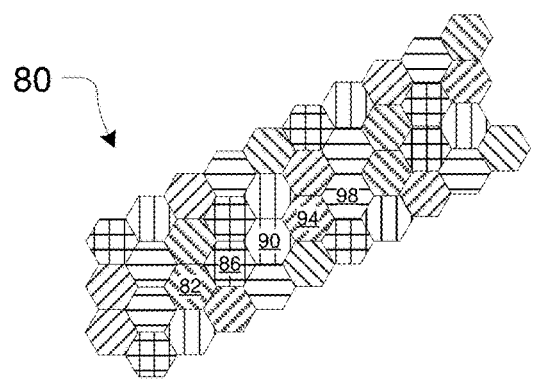
FIG. 5c is a front view of the sub-pixel layout of FIG. 5b translated by one sub-pixel in accordance with some embodiments.
Figure 5D:
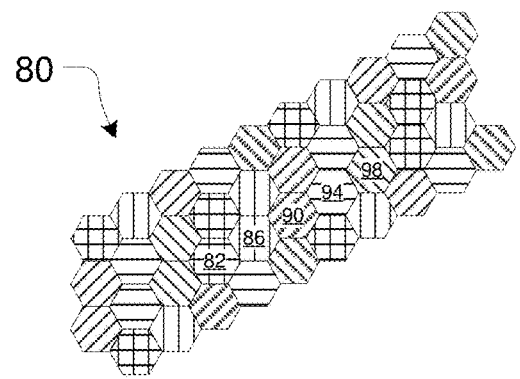
FIG. 5d is a front view of the sub-pixel layout of FIG. 5c translated by one sub-pixel in accordance with some embodiments.
Figure 5E:
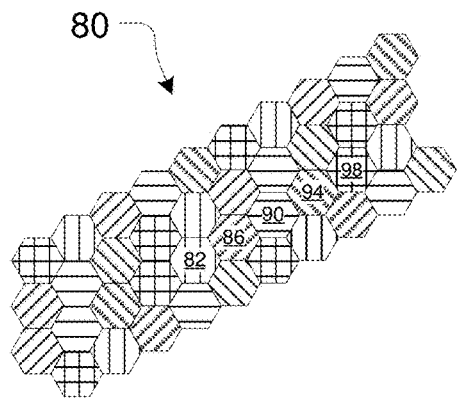
FIG. 5e is a front view of the sub-pixel layout of FIG. 5d translated by one sub-pixel in accordance with some embodiments.

FIG. 5b illustrates sub-pixel layout 80 in a second position, translated parallel to centerline 104 by one sub-pixel. With sub-pixel layout 80 in the second position, sub-pixel location 82 displays the third sub-pixel type, sub-pixel location 86 displays the fourth sub-pixel type, sub-pixel location 90 displays the second sub-pixel type, sub-pixel location 94 displays the fifth sub-pixel type, and sub-pixel location 98 displays the first sub-pixel type. FIG. 5c illustrates sub-pixel layout 80 in a third position, translated parallel to centerline 104 by one sub-pixel relative to the position of FIG. 5b. With sub-pixel layout 80 in the third position, sub-pixel location 82 displays the fourth sub-pixel type, sub-pixel location 86 displays the second sub-pixel type, sub-pixel location 90 displays the fifth sub-pixel type, sub-pixel location 94 displays the first sub-pixel type, and sub-pixel location 98 displays the third sub-pixel type. FIG. 5d illustrates sub-pixel layout 80 in a fourth position, translated parallel to centerline 104 by one sub-pixel relative to the position of FIG. 5c. With sub-pixel layout 80 in the fourth position, sub-pixel location 82 displays second the sub-pixel type, sub-pixel location 86 displays the fifth sub-pixel type, sub-pixel location 90 displays the first sub-pixel type, sub-pixel location 94 displays the third sub-pixel type, and sub-pixel location 98 displays the fourth sub-pixel type. FIG. 5e illustrates sub-pixel layout 80 in a fifth position, translated parallel to centerline 104 by one sub-pixel relative to the position of FIG. 5d. With sub-pixel layout 80 in the fifth position, sub-pixel location 82 displays the fifth sub-pixel type, sub-pixel location 86 displays the first sub-pixel type, sub-pixel location 90 displays the third sub-pixel type, sub-pixel location 94 displays the fourth sub-pixel type, and sub-pixel location 98 displays the second sub-pixel type. Progressing from FIGS. 5a to 5e, every sub-pixel location displays each sub-pixel type once.

Circular temporal sub-pixel averaging will now be described with reference to sub-pixel layout 80 and sub-pixel locations 82, 84, 88, 90, 97, 95, and 96. Sub-pixel layout 80 is the same layout shown in FIG. 5a through 5e, except it illustrates two rows of first spatial pixel 100 and second spatial pixel 102. Sub-pixel locations 82, 84, 88, 90, 97, and 95 lie on a circular or substantially circular path around sub-pixel location 86 and are contiguous. FIG. 6a illustrates sub-pixel layout 80 in a first position with sub-pixel location 82 displaying the first sub-pixel type, sub-pixel location 84 displaying the second sub-pixel type, sub-pixel location 88 displaying the fifth sub-pixel type, sub-pixel location 90 displaying the fourth sub-pixel type, sub-pixel location 97 displaying the third sub-pixel type, sub-pixel location 95 displaying the first sub-pixel type, and sub-pixel location 86 displaying the third sub-pixel type. FIG. 6b through FIG. 6f illustrate sub-pixel layout 80 moving relative to sub-pixel locations 82, 84, 86, 88, 90, 95, and 97 in a circular or substantially circular direction as shown by circular path 107. Sub-pixel layout 80 does not rotate, but instead translates along circular path 107.

FIG. 6b illustrates sub-pixel layout 80 in a second position, translated parallel to centerline 104 one sub-pixel as shown by arrow 108. Sub-pixel location 82 displays the third sub-pixel type, sub-pixel location 84 displays the fifth sub-pixel type, sub-pixel location 88 displays the first sub-pixel type, sub-pixel location 90 displays the second sub-pixel type, sub-pixel location 97 displays the fourth sub-pixel type, sub-pixel location 95 displays the third sub-pixel type, and sub-pixel location 86 displays the fourth sub-pixel type. FIG. 6c illustrates sub-pixel layout 80 in a third position, translated downward one sub-pixel relative to the position of FIG. 6b as shown by arrow 110. Sub-pixel location 82 displays the third sub-pixel type, sub-pixel location 84 displays the fourth sub-pixel type, sub-pixel location 88 displays the second sub-pixel type, sub-pixel location 90 displays the second sub-pixel type, sub-pixel location 97 displays the first sub-pixel type, sub-pixel location 95 displays the fifth sub-pixel type, and sub-pixel location 86 displays the fourth sub-pixel type. FIG. 6d illustrates sub-pixel layout 80 in a fourth position, translated at an angle relative to centerline 104 one sub-pixel relative to the position of FIG. 6c as shown by arrow 112. Sub-pixel location 82 displays the second sub-pixel type, sub-pixel location 84 displays the third sub-pixel type, sub-pixel location 88 displays the fourth sub-pixel type, sub-pixel location 90 displays the first sub-pixel type, sub-pixel location 97 displays the fifth sub-pixel type, sub-pixel location 95 displays the second sub-pixel type, and sub-pixel location 86 displays the fifth sub-pixel type. FIG. 6e illustrates sub-pixel layout 80 in a fifth position, translated parallel to centerline 104 by one sub-pixel relative to the position of FIG. 6d as shown by arrow 114. Sub-pixel location 82 displays fourth the sub-pixel type, sub-pixel location 84 displays the first sub-pixel type, sub-pixel location 88 displays the third sub-pixel type, sub-pixel location 90 displays the fifth sub-pixel type, sub-pixel location 97 displays the second sub-pixel type, sub-pixel location 95 displays the fourth sub-pixel type, and sub-pixel location 86 displays the second sub-pixel type. FIG. 6f illustrates sub-pixel layout 80 in a sixth position, translated at an angle relative to centerline 104 by one sub-pixel relative to the position of FIG. 6e as shown by arrow 116. Sub-pixel location 82 displays the fifth sub-pixel type, sub-pixel location 84 displays the first sub-pixel type, sub-pixel location 88 displays the third sub-pixel type, sub-pixel location 90 displays the third sub-pixel type, sub-pixel location 97 displays the second sub-pixel type, sub-pixel location 95 displays the fourth sub-pixel type, and sub-pixel location 86 also displays the first sub-pixel type. FIG. 6g illustrates sub-pixel layout 80 returning to the first position of FIG. 6a as shown by arrow 117.

Through the circular translation of sub-pixels with respect to sub-pixel locations as shown in FIG. 6a through FIG. 6g, sub-pixel locations may display each sub-pixel type once and one reductant sub-pixel type as shown in the following table. Table 1 shows redundant sub-pixel types in bold.

TABLE 1

Sub-pixel types C1-C5 displayed at sub-pixel locations 82-97 in positions 1-6 shown in FIGS. 6a-6g.

| | Position 1 | Position 2 | Position 3 | Position 4 | Position 5 | Position 6 |
|---|---|---|---|---|---|---|
| Location 82 | C1 | C3 | C3 | C2 | C4 | C5 |
| Location 84 | C2 | C5 | C4 | C3 | C1 | C1 |
| Location 86 | C3 | C4 | C4 | C5 | C2 | C1 |
| Location 88 | C5 | C1 | C2 | C4 | C3 | C3 |
| Location 90 | C4 | C2 | C2 | C1 | C5 | C3 |
| Location 95 | C1 | C3 | C5 | C2 | C4 | C4 |
| Location 97 | C3 | C4 | C1 | C5 | C2 | C2 |

FIGS. 3a through 6g give examples of spatial pixels having sub-pixel layouts suitable for use in spatial, linear temporal, and circular temporal sub-pixel averaging. Temporal sub-pixel averaging may be achieved by physically moving the display device in sync with a changing color pattern. For example, a display device may vibrate at a frequency equal to a rate at with the sub-pixels transition through the sub-pixel types. If the magnitude of the vibration equals a length of a linear arrangement of sub-pixel types, sub-pixel locations may appear to emit various colors and/or combinations of colors of light at different times.

Figure 7:
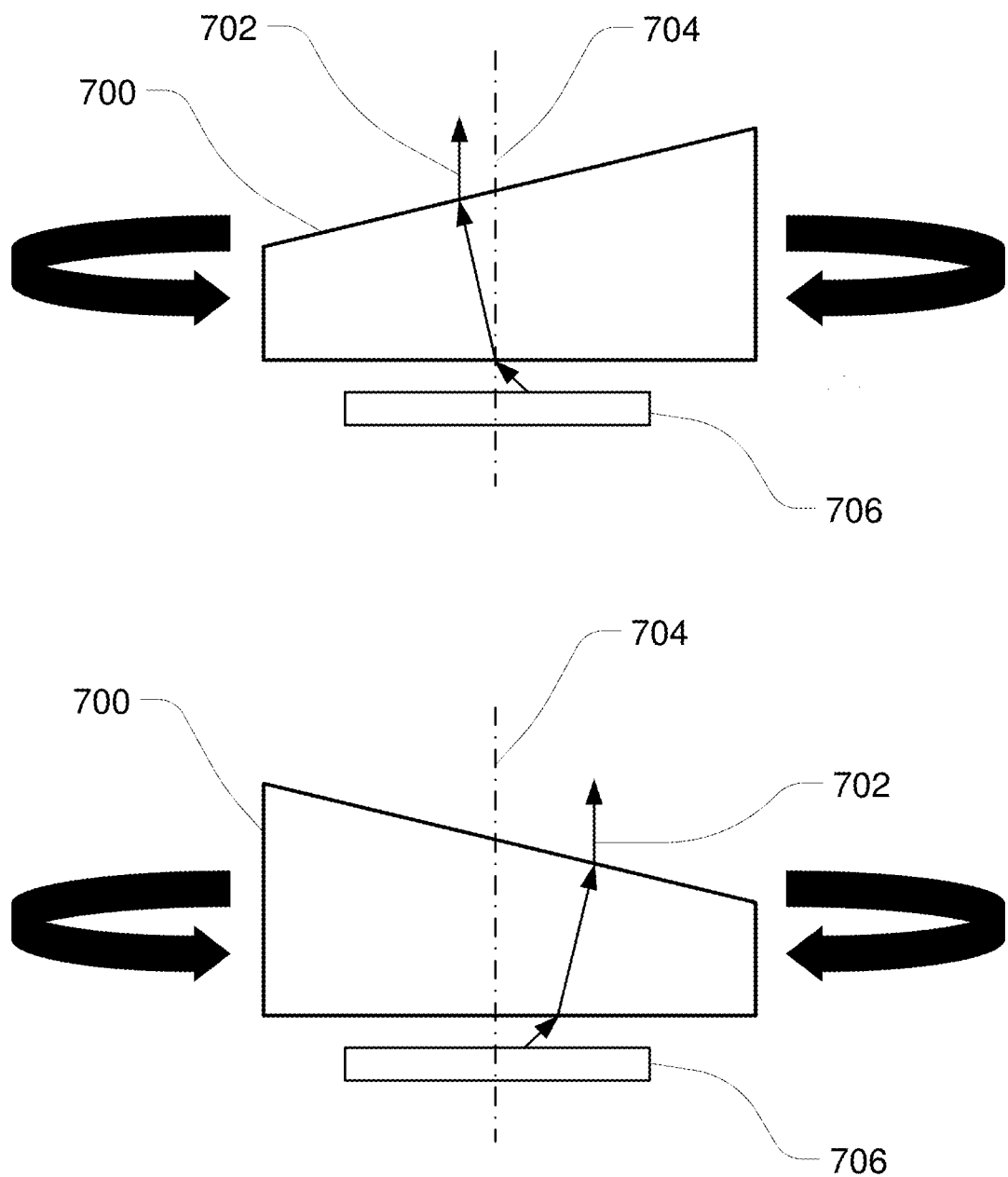
FIG. 7 is a cross-sectional side view of an example rotating prism for altering a light path disposed over a light-emitting region in accordance with some embodiments.

According to some embodiments, another technique suitable for temporal sub-pixel averaging includes altering the light path of various sub-pixel types (via, e.g., one or more prisms) so that colors of multiple sub-pixel types appear to emit from the same sub-pixel location without the display device physically moving. FIG. 7 illustrates an example of a rotating prism 700 that may alter a light path 702 from an exemplary light-emitting region of a display 706 by one or more sub-pixel widths, resulting in a sub-pixel location that includes light from multiple adjacent sub-pixel types disposed along a circular path centered about and/or surrounding the sub-pixel location. In the top example shown in FIG. 7, light path 702 emits from a location to the left of axis 704, while in the lower example, light path 702 emits from a location to the right of axis 704. The source of light path 702 has not changed, but the emitted location varies in a circular path in conjunction with rotation of rotating prism 700. If the time it takes to travel one full rotation of the rotating prism 700 equals the time to transition through the colors of light from a sub-pixel, a single sub-pixel location may appear to emit the colors of light during one rotation of the prism. Rotating prism 700 may be utilized with any suitable sub-pixel layout, including the exemplary sub-pixel layouts disclosed herein.

FIG. 8*a* through FIG. 8*d* illustrate an example of a rotating prism 800 (see, e.g., rotating prism 700 illustrated in FIG. 7) altering a light path causing a single location 802 to emit light from four different sub-pixel types, 804, 806, 808, and 810. In some examples, each sub-pixel type may correspond to a different color, as shown by the four distinct patterns of FIG. 8*a* through FIG. 8*d*, or in some examples a sub-pixel color may be repeated as shown in FIG. 3*a* through FIG. 3*d*. Arrow 812 indicates a direction in which the light path is altered and varies dependent on the rotation of rotating prism 800. In FIG. 8*a*, arrow 812 points down and to the right, resulting in single location 802 displaying sub-pixel type 804, which is located up and to the left of single location 802. In FIG. 8*b*, arrow 812 points down and to the left, resulting in single location 802 displaying sub-pixel type 806, which is located up and to the right of single location 802. In FIG. 8*c*, arrow 812 points up and to the left, resulting in single location 802 displaying sub-pixel type 808, which is located down and to the right of single location 802. In FIG. 8*d*, arrow 812 points up and to the right, resulting in single location 802 displaying sub-pixel type 810, which is located down and to the left of single location 802.

Figure 9A:
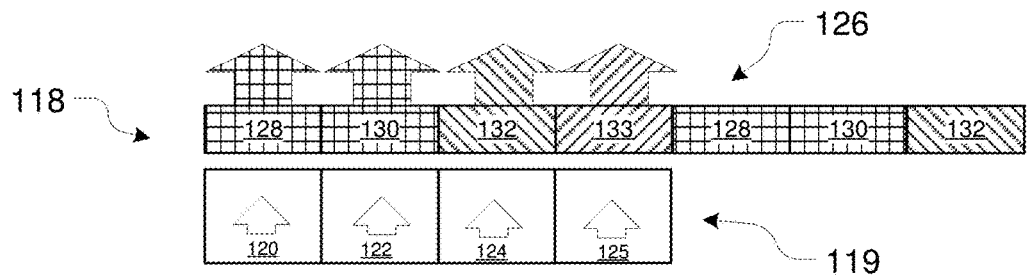
FIG. 9a is a cross-sectional side view of a linear translation of a color selector layer over light-emitting regions in accordance with some embodiments.

FIG. 9*a* through FIG. 9*d* illustrate an emissive display device 118 suitable for use with linear temporal sub-pixel averaging. In FIG. 9*a*, a light emitting layer 119 may include light-emitting regions 120, 122, 124, and 125 that emit light which passes through an overlapping color selector layer 126 to produce colored light. Color selector layer 126 may be parallel to light-emitting layer 119 such that parallel movement of the color selector layer 126 relative to the light-emitting layer 119 results in differing locations of color selector layer 126 being positioned over the light-emitting regions. In at least one example, light-emitting regions 120-125 may include regions of light emitted from a backlight unit and passing through a light-modulating layer, such as a liquid crystal layer. Additionally, or alternatively, light-emitting regions 120-125 may include regions of light corresponding to individual LED elements, OLED elements, plasma cells, electrophoretic display elements, electrowetting display elements, CRT elements, and/or any other suitable sub-pixel technology.

In at least one embodiment, light-emitting regions 120, 122, 124, and 125 may emit light that, when passed through color selector layer 126, produces colored light corresponding to overlapping regions of color selector layer 126 that are arrayed according to a sub-pixel layout as described herein (see, e.g., sub-pixel layouts 40 and 80 shown in FIGS. 3*a*-6*g*). In at least one embodiment, light-emitting regions 120, 122, 124, and 125 may emit light (e.g., white light) that, when passed through the color selector layer, is filtered such that specific ranges of light wavelengths corresponding to particular colors are respectively emitted from overlapping regions of color selector layer 126. In some embodiments, light-emitting regions 120, 122, 124, and 125 may emit light (e.g., blue or ultraviolet light) that, when passed through color selector layer 126, is converted to specific ranges of light wavelengths corresponding to particular colors.

Color selector layer 126 shown in FIGS. 9*a*-*d* has an array of different color selectors having the same spacing as light-emitting regions 120, 122, 124, and 125 of light emitting layer 119. Color selector layer 126 may include color selectors arranged in groups. In at least one example, color selector layer 126 may include color selector groups that each include a plurality of color selector types (e.g., three, four, or more color selector types) that filter or convert light to respectively emit different colors of light. For example, as shown in FIGS. 9*a*-9*d*, color selector layer 126 may include a first color selector 128, a second color selector 130, a third color selector 132, and a fourth color selector 133 in a linear repeating pattern. In the example shown in FIGS. 9*a*-9*d*, first color selector 128 and second color selector 130 may emit the same color. In other examples, each of color selectors 128, 130, 132, and 133 may emit a different color.

Figure 9B:
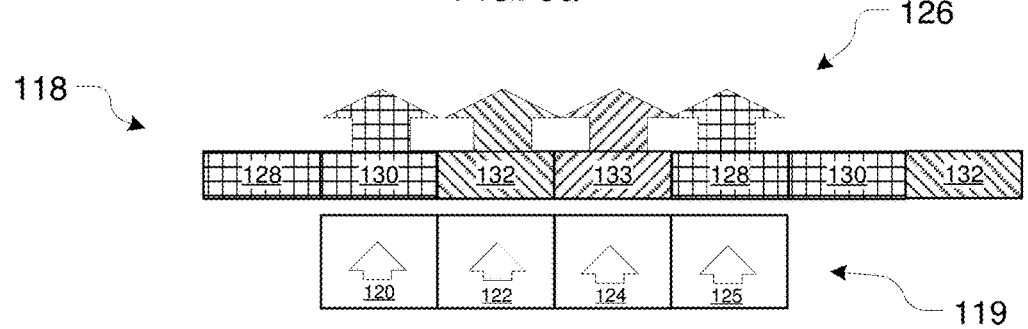
FIG. 9b is a continuation of the example of FIG. 9a in accordance with some embodiments.
Figure 9C:
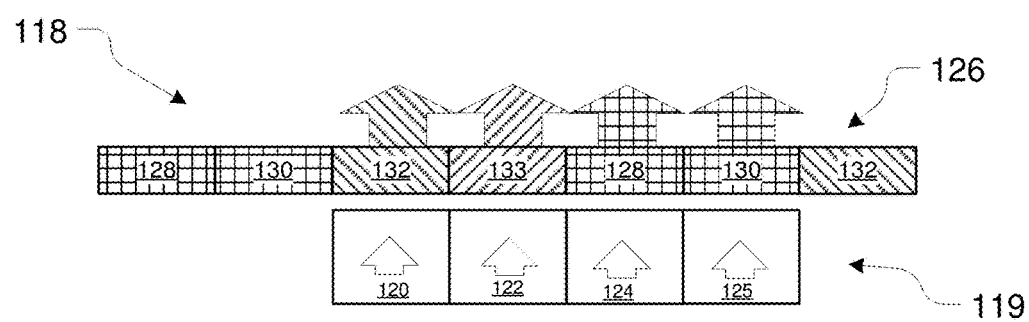
FIG. 9c is a continuation of the example of FIG. 9a in accordance with some embodiments.
Figure 9D:
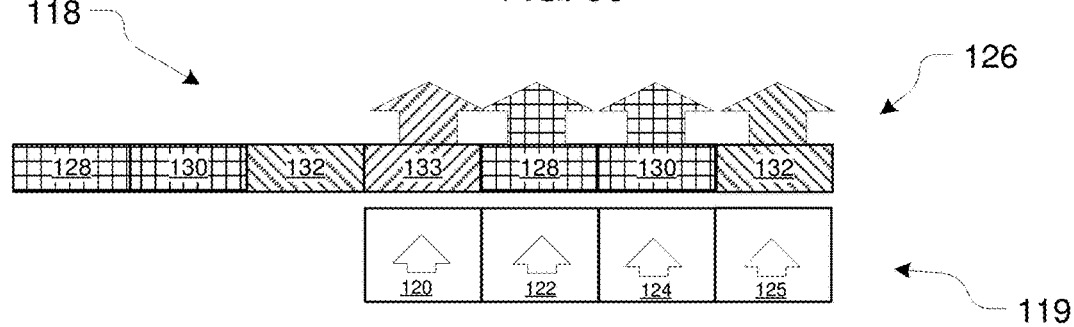
FIG. 9d is a continuation of the example of FIG. 9a in accordance with some embodiments.

FIG. 9*a* depicts emissive display device 118 in a first position with first color selector 128 covering first light-emitting region 120, second color selector 130 covering second light-emitting region 122, third color selector 132 covering third light-emitting region 124, and fourth color selector 133 covering fourth light-emitting region 125. When light-emitting regions 120, 122, 124, and 125 emit light, color selectors 128, 130, 132, and 133 may filter or convert the emitted light, thereby producing the respective colors. In FIG. 9*b*, color selector layer 126 has moved one space to the left, such that second color selector 130 covers first light-emitting region 120, third color selector 132 covers second light-emitting region 122, fourth color selector 133 covers third light-emitting region 124, and first color selector 128 covers fourth light-emitting region 125. FIG. 9*c* illustrates color selector layer 126 further moved one sub-pixel to the left, such that third color selector 132 covers first light-emitting region 120, fourth color selector 133 covers second light-emitting region 122, first color selector 128 covers third light-emitting region 124, and second color selector 130 covers fourth light-emitting region 125. FIG. 9*d* illustrates color selector layer 128 further moved one sub-pixel to the left, such that fourth color selector 133 covers first light-emitting region 120, first color selector 128 covers second light-emitting region 122, second color selector 130 covers third light-emitting region 124, and third color selector 132 covers fourth light-emitting region 125. Thus, light-emitting regions 120, 122, 124, and 125 each emit each color of color selector layer 126 at different moments in time.

While FIGS. 9*a*-*d* depict four light-emitting regions in a single row, in some embodiments, the pattern may be repeated for longer lengths and/or the display device may have additional rows of light-emitting regions. For example, a display device may have thousands of light-emitting regions in a single row. Additionally, color selector layer 126 is not limited to four color selectors. Color selector layer 126 may have any suitable number of colors having a repeating pattern. For example, if the color selector has five different colors, the color selector may move five sub-pixel lengths to allow each light-emitting region to emit each color of light. In at least one example, color selector layer 126 may include a sub-pixel pattern that is greater than a dimension of the sub-pixel elements by the number of different color selectors types in the color selector layer 126. For example, light-emitting regions may be arranged in linear rows of N elements, each color selector group of the color selector may contain M color selectors, and the color selectors may be arranged in linear rows of N+(X*M)−1 elements, where X is a positive integer representing the number of color selector groups. If a color selector layer has, for example, five different color selector types arranged in a linear row and the display device includes one thousand light-emitting regions in a row, then the color selector layer may have one thousand and four color selectors in each row.

While FIGS. 9a-9d illustrate exemplary emissive display device 118 having color selector layer 126 that includes color selectors 128, 130, 132, and 133 utilized with a light-emitting layer having light-emitting regions 120, 122, 124, and 125 in linear temporal sub-pixel averaging, an emissive display device may include a color selector layer with any suitable layout of color selectors and a light-emitting layer having any suitable layout of light-emitting regions. For example, a color selector layer of an emissive display device may include any suitable layout of color selectors having any suitable number of color selector types arranged in accordance with any of the sub-pixel layouts disclosed herein (see, e.g., FIGS. 3a-6g and 8a-8d) and/or any other suitable sub-pixel layouts. A corresponding light-emitting layer may include any suitable layout and number of light-emitting regions. Such a color selector layer may be translated laterally in any suitable directions relative to the light-emitting layer to accomplish linear temporal, circular temporal, and/or any other suitable temporal sub-pixel averaging. Additionally or alternatively, such a color selector layer may be held stationary relative to the light-emitting layer when utilized in spatial sub-pixel averaging.

Figure 10:
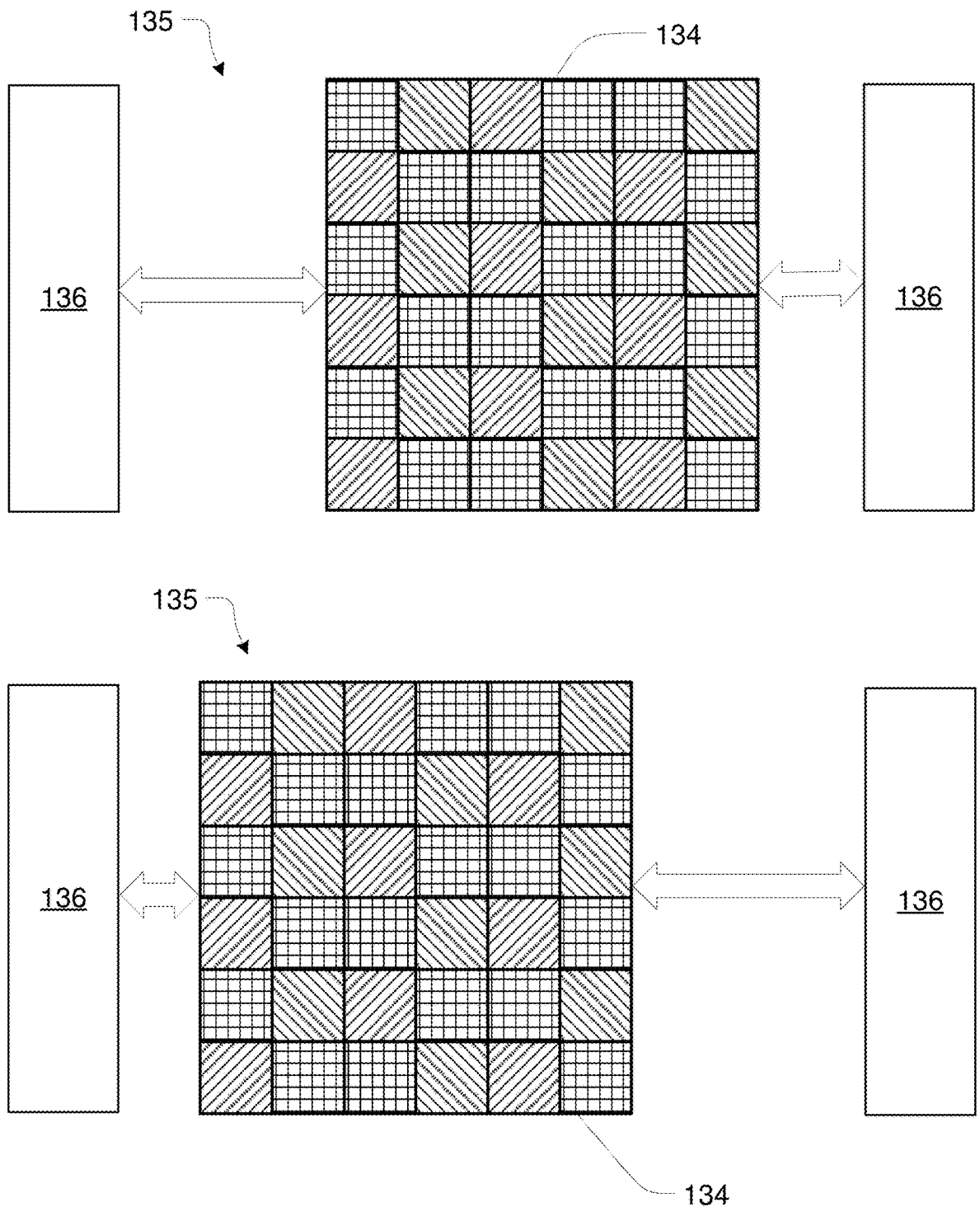
FIG. 10 is a front view of an emissive display having a moving color selector in accordance with some embodiments.

FIG. 10 illustrates an example of an emissive display device 135 suitable for use with a moving color selector layer 134 as described in relation to FIGS. 9a-d. Emissive display device 135 shown in FIG. 10 includes a color selector layer 134 and at least one linear actuator 136, such as the pair of illustrated linear actuators 136. Linear actuators 136 include any component capable of accurately displacing color selector layer 134 at sub-pixel distances. For example, OLED and LCD display devices may show updated images at a rate of 120 frames per second or slower. To preserve this frame rate, color selector layer 134 may move rapidly enough to allow all colors to emit from each pixel location within the duration of a single frame. For example, in a display device with 5 μm-wide sub-pixels and three sub-pixels forming a pixel, color selector layer translating at 1.8 mm/s would produce a display of 5 μm-wide effective pixels updating at 120 frames per second, with an effective 3x resolution increase compared to spatial pixel averaging. Suitable linear actuators 136 may include, for example, piezoelectric materials, microelectromechanical systems (MEMS), and/or any other suitable type of actuator. In some embodiments, emissive display device 135 may include one or more additional actuators for translating color selector layer 134 in various directions. For example, in addition to linear actuators 136, emissive display device 135 may include at least one actuator (e.g., at least one linear actuator) disposed above and/or below color selector layer 134 shown in FIG. 10. The at least one additional actuator may further allow for linear translation of color selector layer 134 in perpendicular and/or oblique directions relative to the displacement directions shown in FIG. 10. Additionally or alternatively, in combination with linear actuators 136, the at least one additional actuator may, for example, allow for circular, substantially circular, and/or any other suitable lateral displacement of color selector layer 134 as described herein.

The physical location of color selector layer 134 may be dependent on the design and purpose of emissive display device 135. For example, if emissive display device 135 is an LCD display device, color selector layer 134 may be disposed directly adjacent the liquid crystal layer to prevent white light intended for one sub-pixel from spreading to adjacent sub-pixels. In another example, if emissive display device 135 is an OLED display device, color selector layer may be disposed adjacent the emissive surface of the OLEDs. In another example, if emissive display device 135 involves collimation of emitted light, color selector layer may be placed anywhere along the path of the light, with the ideal location determined by the specific physical design of the display device.

The color selector layers described herein may include any suitable types of color selectors utilized in any suitable types of emissive display devices, without limitation. For example, a color selector layer may be a color filter layer having a plurality of color selectors including color filters (e.g., dichroic band-pass filters, pigmented materials, etc.) that filter light (e.g., white light) from one or more light sources such that specified ranges of light wavelengths corresponding to particular colors are respectively emitted from each of the color filters. In some examples, a color selector layer may convert blue light into other colors, such as red and green, through the use of materials such as phosphors, quantum dots, and metallic nanoparticles. Additionally or alternatively, a color selector layer may convert ultraviolet (UV) light into colors such as red, green, and blue. For example, such a color selector layer may be a color converting layer (e.g., a color converting emissive layer) having a plurality of color selectors including color converting materials (e.g., phosphors, quantum dots, metallic nanoparticles, etc.) that convert light, such as blue or UV light, from one or more light sources into particular colors. In such examples, when a blue light source is utilized, color selectors corresponding to a blue color may include a material that allows passage of blue light from the light source without conversion to another color. Accordingly, the moving color selector layers described herein may be used to turn a collection of blue or UV emitters into a full-color display device using a moveable layer having a patterned array of color-converting materials.

FIG. 11a through FIG. 11d illustrate a portion of an emissive display device 200 suitable for use with temporal sub-pixel averaging using a rotating color selector layer 202. Color selector layer 202 may overlap a light emitting layer (see, e.g., FIGS. 9a-9d) and may rotate (e.g., by a rotational actuator) parallel to a surface of the light-emitting layer. Color selector layer 202 includes a plurality of color selectors that include, for example, four color selector types 204, 206, 208, and 210. The color selectors of color selector layer 202 may be arranged, for example, in groups of four color selectors with each of the groups including one of each color selector type 204, 206, 208, and 210. Each of color selector types 204, 206, 208, and 210 may filter and/or convert light to a particular color as indicated by the respective patterns. In the example of FIG. 11a through FIG. 11d, each color selector type may overlap an underlying light emitting region in the light emitting layer. The light-emitting regions may be operable to selectively emit a controlled intensity of light. Light-emitting regions may be arranged in a pattern matching that of color selector types 204, 206, 208, and 210 in color selector layer 202. Light-emitting from each light-emitting region may be converted to a color light as it passes through a color selector type of rotating color selector layer 202. In at least one example, light-emitting regions may include regions of light emitted from a backlight unit and passing through a light-modulating layer, such as a liquid crystal layer. Additionally, or alternatively, light-emitting regions may include regions of light corresponding to individual LED elements, OLED elements, plasma cells, electrophoretic display elements, electrowetting display elements, CRT elements, and/or any other suitable sub-pixel technology.

In at least one embodiment, the overlapped light-emitting regions may emit light that, when passed through rotating color selector layer 202, produce colored light corresponding to overlapping regions of rotating color selector layer 202. In at least one embodiment, the light-emitting regions may emit light (e.g., white light) that, when passed through color selector layer 202, is filtered such that specific ranges of light wavelengths corresponding to particular colors are respectively emitted from overlapping regions of the color selector layer 202. In some embodiments, the light-emitting regions may emit light (e.g., blue or ultraviolet light) that, when passed through color selector layer 202, is converted to specific ranges of light wavelengths corresponding to particular colors.

Figure 11A:
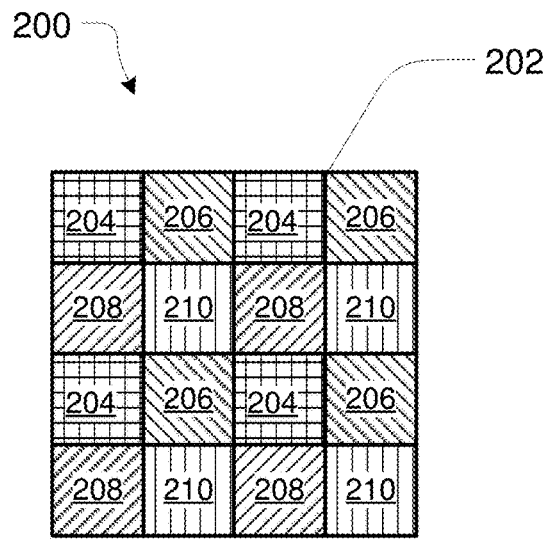
FIG. 11a is a front view of a portion of an example rotating color selector layer disposed over light-emitting regions in accordance with some embodiments.
Figure 11B:
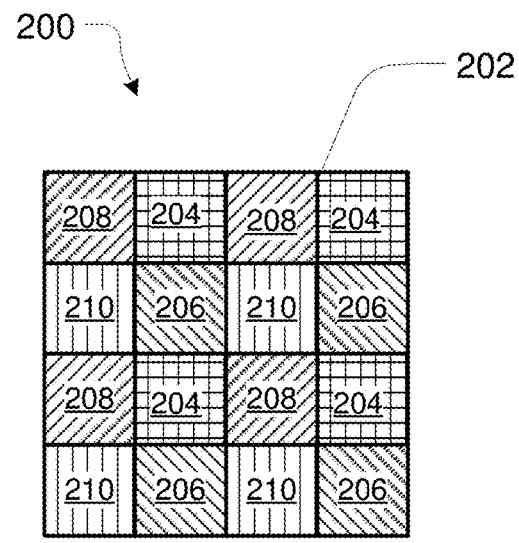
FIG. 11b is a continuation of the example of FIG. 11a in accordance with some embodiments.

FIG. 11a depicts emissive display device 200 including color selector layer 202 in a first position with first color selector types 204 covering corresponding first light-emitting regions of the light-emitting layer, second color selector types 206 covering second light-emitting regions of the light-emitting layer, third color selector types 208 covering third light-emitting regions of the light-emitting layer, and fourth color selector types 210 covering a fourth light-emitting regions of the light-emitting layer. When the light-emitting regions emit light, color selector types 204, 206, 208, and 210 may filter or convert the emitted light, thereby producing the respective colors. In FIG. 11b, color selector type layer 202 has rotated clockwise 90 degrees such that third color selector types 208 cover the first light-emitting regions previously covered by first color selector types 204, first color selector types 204 cover the second light-emitting regions previously covered by second color selector types 206, fourth color selector types 210 cover the third light-emitting regions previously covered by third color selector types 208, and second color selector types 206 cover the fourth light-emitting regions previously covered by fourth color selector types 210.

Figure 11C:
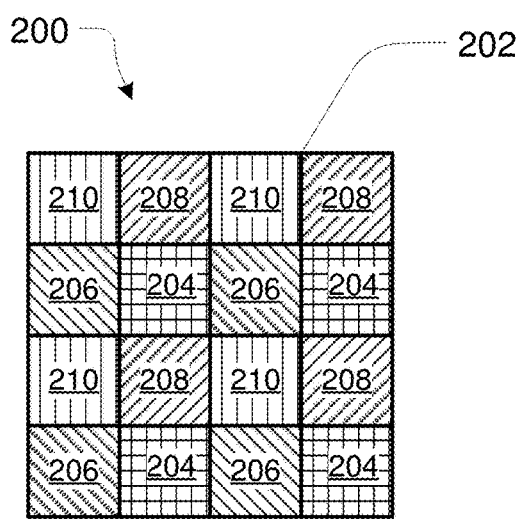
FIG. 11c is a continuation of the example of FIG. 11a in accordance with some embodiments.
Figure 11D:
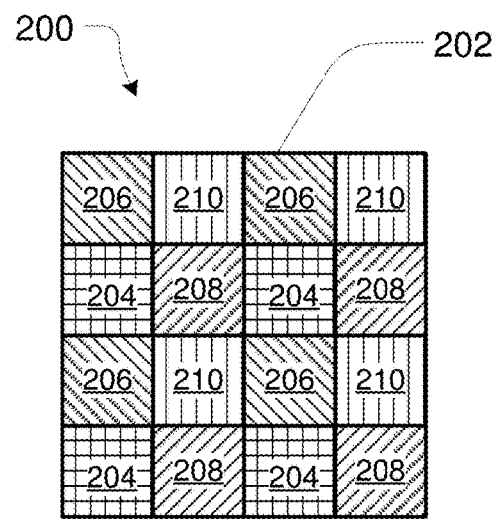
FIG. 11d is a continuation of the example of FIG. 11a in accordance with some embodiments.

FIG. 11c illustrates color selector layer 202 further rotated 90 degrees clockwise such that fourth color selector types 210 cover the first light-emitting regions originally covered by first color selector types 204, third color selector types 208 cover the second light-emitting regions originally covered by second color selector types 206, second color selector types 206 cover the third light-emitting regions originally covered by third color selector types 208, and first color selector types 204 cover the fourth light-emitting regions originally covered by fourth color selector types 210. FIG. 11d illustrates color selector layer 202 further rotated 90 degrees clockwise such that second color selector types 206 cover the first light-emitting regions originally covered by first color selector types 204, fourth color selector types 210 cover the second light-emitting regions originally covered by second color selector types 206, first color selector types 204 cover the third light-emitting regions originally covered by third color selector types 208, and third color selector types 208 cover the fourth light-emitting regions originally covered by fourth color selector types 210. Thus, light emitted from each of the light-emitting regions may be converted to each of the colors of color selector layer 202 at different moments in time. The light-emitting regions may each be timed to emit light in coordination with the rotation of color selector layer 202 to accomplish temporal sub-pixel averaging of the corresponding colors emitted from the respective color selector types of color selector layer 202.

In one example, a rotational actuator may spin color selector layer 202 at a constant rate, with the light-emitting layer selectively turning off and subsequently turning on light-emitting regions when the color selectors of color selector layer 202 are suitably positioned over the light-emitting regions. In another example, color selector layer 202 may be spun at a variable rate such that color selector layer 202 slows down or even pauses when suitably positioned over the light-emitting layer. For example, each time the light-emitting regions are turned on, the color selector layer 202 may be temporarily held in position over the light emitting layer. Although a group of 16 color selectors are shown in FIGS. 11a-11d, color selector layer 202 may include any suitable number of color selectors arranged, for example, in a recursive pattern of grouped color selector types (e.g., color selector types 204, 206, 208, and 210) as shown.

Figure 12:
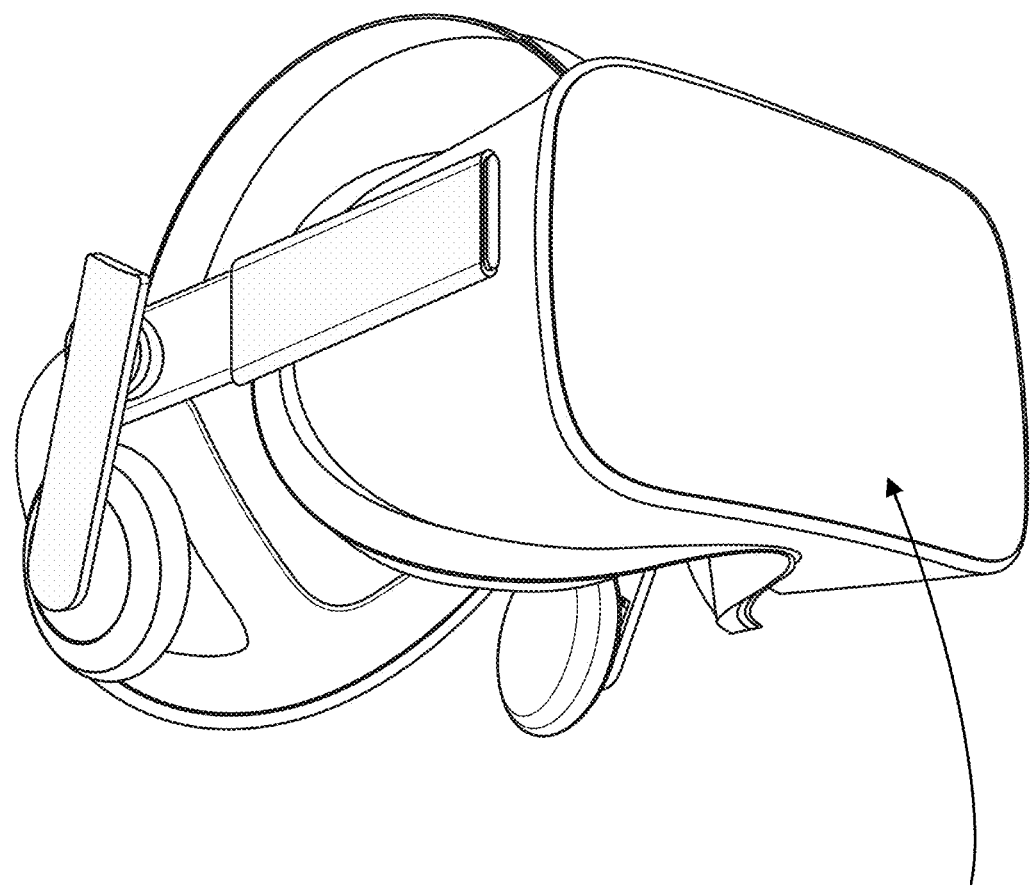
FIG. 12 is perspective view of an example head mounted display (HUD) in accordance with some embodiments.

FIG. 12 is a perspective view of an exemplary head-mounted display (HMD) 138 that may incorporate the described sub-pixel layout for presentation of images to a user. To present these images, HMD 138, in some embodiments, may include at least one physical processor, a computer-readable medium storing instructions for execution by the physical processor, and a display system 140 including the sub-pixel layout.

Figure 13:
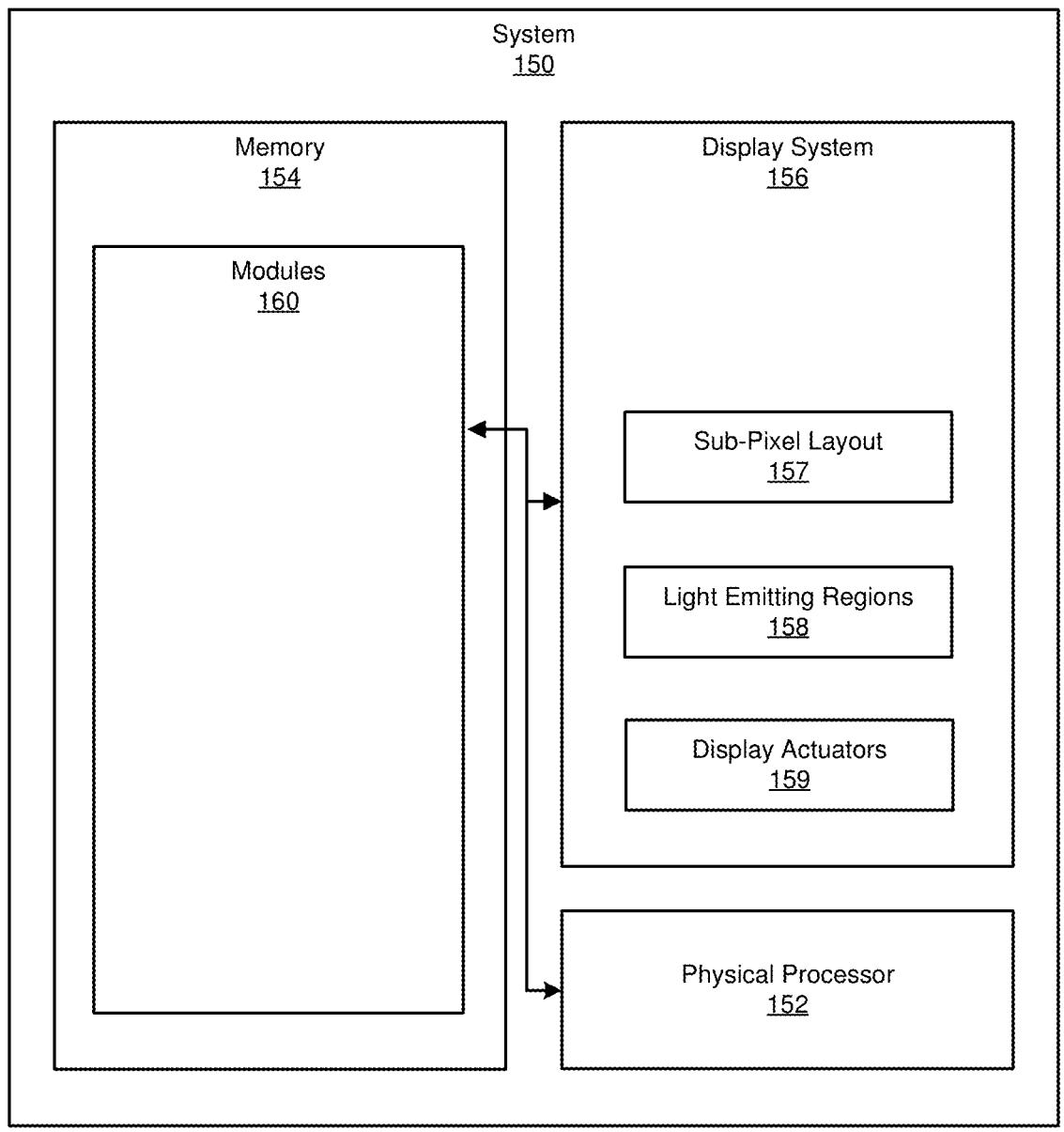
FIG. 13 is a block diagram of a system suitable for implementing the disclosed sub-pixel layouts in accordance with some embodiments.

FIG. 13 is a block diagram of an example display system 150 including a physical processor 152, computer-readable media in the form of memory 154, and a display system 156. According to some embodiments, display system 156 may include a sub-pixel layout 158 (see, e.g., sub-pixel layouts 40 and 80 shown in FIGS. 3a-6g and/or color selector layer 126 shown in FIGS. 9a-d), a plurality of light-emitting regions 158 (see, e.g., light-emitting regions 120-125 shown in FIGS. 9a-9d), and one or more display actuators 159 (see, e.g., linear actuators 136 shown in FIG. 10). As illustrated in FIG. 13, display system 150 may also include one or more modules 160 for performing one or more tasks as disclosed herein, including actions performed by one or more of sub-pixel layout 158, light-emitting regions 158, and/or display actuators 159.

Figure 14:
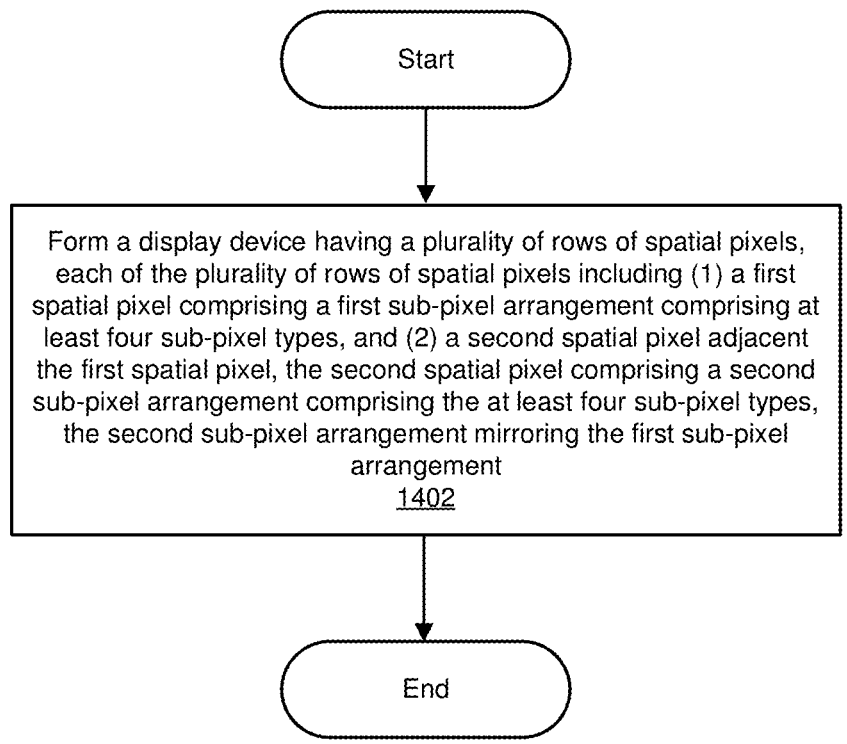
FIG. 14 is a flow diagram of an exemplary method for manufacturing a display device in accordance with some embodiments.

FIG. 14 is a flow diagram of an example method 1400 for manufacturing an emissive display device. As illustrated in FIG. 14, at step 1402 a display device having a plurality of rows of spatial pixels may be formed. Each of the plurality of rows of spatial pixels may include a first spatial pixel and a second spatial pixel adjacent one another. The first spatial pixel may have a first sub-pixel arrangement including at least four sub-pixel types and the second spatial pixel may have a second sub-pixel arrangement including the at least four sub-pixel types, the second sub-pixel arrangement mirroring the first sub-pixel arrangement. Each spatial pixel may be positioned with one of each sub-pixel type of the at least four sub-pixel types lying in a contiguous linear path and at least one of each sub-pixel type of the at least four sub-pixel types lying in a contiguous circular path having a diameter less than a combined width of each sub-pixel type of the at least four sub-pixel types.

Figure 15:
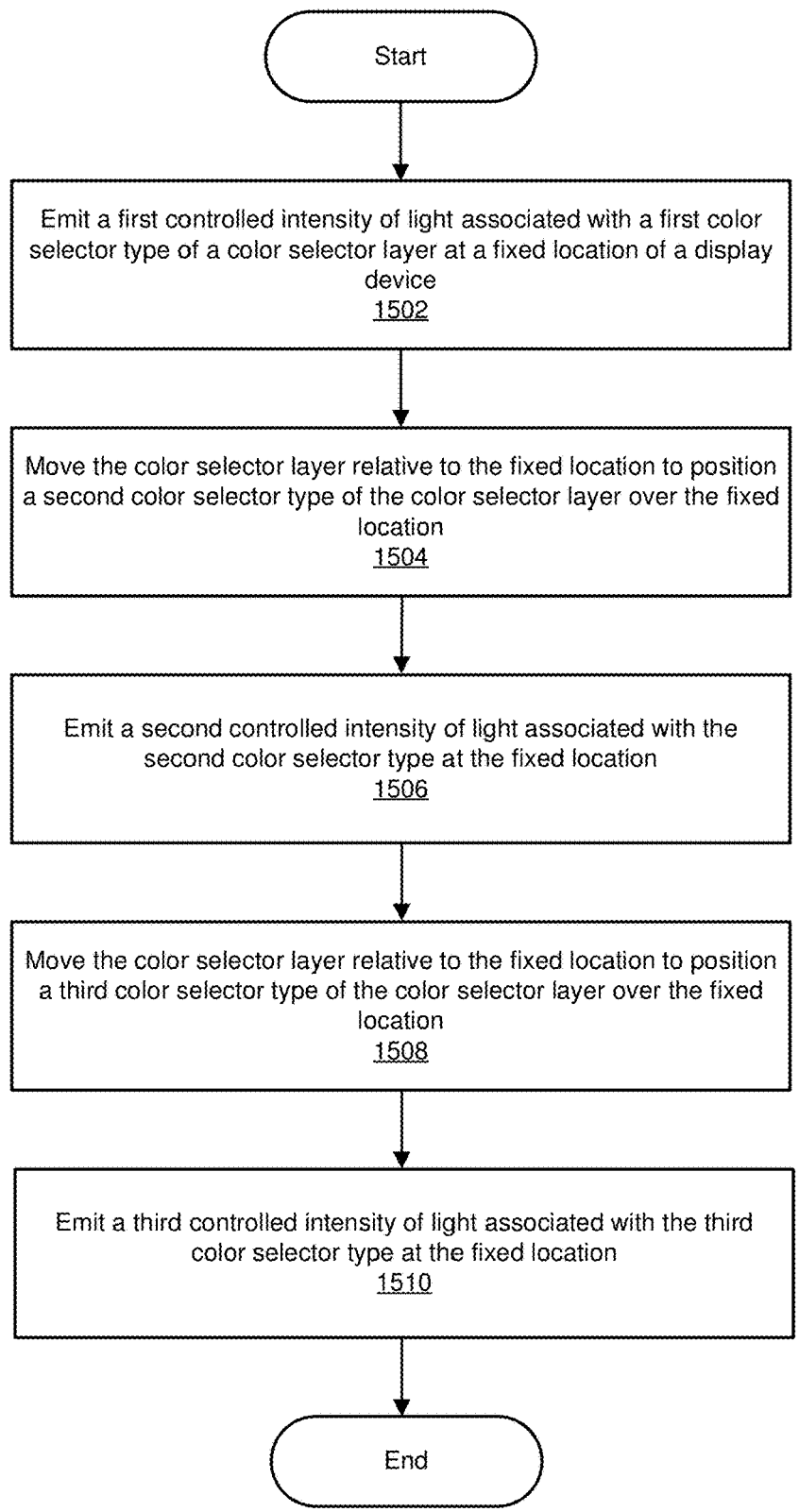
FIG. 15 is a flow diagram of an exemplary method for displaying color in a display device in accordance with some embodiments.

FIG. 15 is a flow diagram of an example method 1500 for displaying color in an emissive display device. The steps shown in FIG. 15 may be performed by any suitable computer-executable code and/or computing system, including display system 150 in FIG. 13. As illustrated in FIG. 15, at step 1502, a first controlled intensity of light associated with a first color selector type of a color selector layer may be emitted at a fixed location of the display device. In one example, light-emitting region 120 may emit a light having an intensity associated with first color selector 128 (see, e.g., FIGS. 9a and 10). At step 1504, the color selector layer may be moved relative to the fixed location to position a second color selector type of the color selector layer over the fixed location. For example, linear actuator 136 may move color selector layer 126 to position second color selector 130 over light-emitting region 120 (see, e.g., FIGS. 9b and 10). At step 1506, a second controlled intensity of light associated with the second color selector type may be emitted at the fixed location. For example, light-emitting region 120 may emit light having an intensity associated with second color selector 130. In step 1508, the color selector layer may be moved relative to the fixed location to position a third color selector type of the color selector layer over the fixed location. For example, linear actuator 136 may move color selector layer 126 to position third color selector 132 over light-emitting region 120 (see, e.g., FIGS. 9c and 10). At step 1510, a third controlled intensity of light associated with the third color selector type may be emitted at the fixed location. For example, light-emitting region 120 may emit light with an intensity associated with third color selector 132.

The described display devices, sub-pixel arrangements, and methods may allow for spatial, linear temporal, circular temporal, and/or any other suitable temporal sub-pixel averaging, enabling an increased range of pixel colors to be displayed without sacrificing resolution or increasing the display area. Additionally, the disclosed devices, systems, and methods may enable display resolution to be enhanced using a movable color selector layer and/or prism that enables each sub-pixel location to function as a pixel emitting various colors that are averaged temporally. Each pixel may include sub-pixels that are operable to emit a white light when illuminated together. Each color of sub-pixel may further lie on a linear path such that a linear translation will allow each color sub-pixel to appear in the same location. Furthermore, each color of sub-pixel may lie on a circular path such that a circular translation will allow each color sub-pixel to appear in the same location. In some examples, a color selector layer may move while the light source remains stationary.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A display device comprising:
a light-emitting layer comprising a plurality of light-emitting regions, wherein at least some of the plurality of light-emitting regions are operable to emit a varying, controlled intensity of light at a respective fixed location;
a color selector layer disposed over the plurality of light-emitting regions, the color selector layer comprising at least one group of color selectors that each convert light emitted from an overlapping light-emitting region to one color of a group of colors; and
an actuator operable to move the color selector layer between a plurality of positions relative to the light-emitting layer;
wherein:
the movement of the color selector layer between the plurality of positions results in each color selector of the at least one group of color selectors passing each fixed location; and
when the color selector layer is positioned in one of the plurality of positions, emitted light from at least two of the plurality of light-emitting regions is simultaneously converted by at least two of the group of color selectors into at least two different colors of the group of colors.

2. The display device of claim 1, wherein:
the light-emitting regions are spaced at a regular interval;
the at least one group of color selectors comprises a plurality of groups of color selectors; and
the color selectors are spaced at the regular intervals.

3. The display device of claim 1, wherein the actuator is operable to move the color selector layer such that each color selector of a group of color selectors passes over a light-emitting region for the same period of time.

4. The display device of claim 1, wherein each light-emitting region of the light-emitting layer emits a white light.

5. The display device of claim 4, wherein at least one of the color selectors comprises a pigmented material.

6. The display device of claim 4, wherein at least one of the color selectors comprises a dichroic band-pass filter.

7. The display device of claim 1, wherein each light-emitting region of the light-emitting layer emits at least one of a blue light or an ultraviolet light.

8. The display device of claim 7, wherein at least one of the color selectors comprises at least one of a phosphor, a quantum dot, or a metallic nanoparticle.

9. The display device of claim 1, wherein:
the light-emitting regions are arranged in linear rows of N elements;
each color selector group contains M color selectors; and
the color selectors are arranged in linear rows of at least N+(X*M)−1 elements;
wherein X is a positive integer.

10. The display device of claim 1, wherein the actuator comprises at least one of a piezoelectric material or a microelectromechanical systems actuator.

11. The display device of claim 1, wherein the actuator is operable to move the color selector layer laterally relative to the light-emitting layer.

12. The display device of claim 1, wherein the actuator is operable to move the color selector layer circularly relative to the light-emitting layer.

13. The display device of claim 1, wherein the actuator is operable to rotate the color selector layer relative to the light-emitting layer.

14. The display device of claim 1, wherein the actuator is operable to move the color selector layer in a direction parallel to a surface of the light-emitting layer.

15. The display device of claim 1, wherein:
the light-emitting layer comprises a liquid crystal layer; and
the color selector layer is adjacent the liquid crystal layer.

16. The display device of claim 1, wherein:
each light-emitting region comprises an organic light-emitting diode; and
the color selector layer is adjacent the organic light-emitting diodes.

17. A head-mounted-display apparatus comprising:
a body;
a display system housed in the body, the display system comprising:
a light-emitting layer comprising a plurality of light-emitting regions, wherein at least some of the plurality of light-emitting regions are operable to emit a varying, controlled intensity of light at a respective fixed location;
a color selector layer disposed over the plurality of light-emitting regions, the color selector layer comprising at least one group of color selectors that each convert light emitted from an overlapping light-emitting region to one color of a group of colors; and
an actuator operable to move the color selector layer between a plurality of positions relative to the light-emitting layer;
wherein:
the movement of the color selector layer results in each color selector of the at least one group of color selectors passing each fixed location; and
when the color selector layer is positioned in one of the plurality of positions, emitted light from at least two of the plurality of light-emitting regions is simultaneously converted by at least two of the group of color selectors into at least two different colors of the group of colors.

18. The head-mounted-display apparatus of claim 17, wherein at least one of the color selectors comprises at least one of a color filter or a color converting material.

19. A method, comprising:
positioning a first plurality of color selector types of a color selector layer over a plurality of fixed locations of a display device;
emitting light associated with the first plurality of color selector types at the plurality of fixed locations such that the first plurality of color selector types simultaneously converts the light emitted from the plurality of fixed locations into at least two different colors;
moving the color selector layer relative to the plurality of fixed locations to position a second plurality of color selector types of the color selector layer over the plurality of fixed locations; and
emitting light associated with the second plurality of color selector types at the plurality of fixed locations.

20. The method of claim 19, wherein the light associated with the first plurality of color selector types and the light associated with the second plurality of color selector types are emitted over a predefined period of time such that light passing through one of the first plurality of color selector types and light passing through one of the second plurality of color selector types perceptually combine to appear as a specified color.

21. The method of claim 20, wherein the specified color corresponds to an instruction for displaying an image.

22. The method of claim 19, further comprising:
moving the color selector layer relative to the plurality of fixed locations to position a third plurality of color selector types of the color selector layer over the plurality of fixed locations; and
emitting light associated with the third plurality of color selector types at the plurality of fixed locations.

23. The method of claim 22, further comprising:
moving the color selector layer relative to the plurality of fixed locations to position a fourth plurality of color selector types of the color selector layer over the plurality of fixed locations; and
emitting light associated with the fourth plurality of color selector types at the plurality of fixed locations.

24. The method of claim 23, further comprising:
moving the color selector layer relative to the plurality of fixed locations to position a fifth plurality of color selector types of the color selector layer over the plurality of fixed locations; and
emitting light associated with the fifth plurality of color selector types at the plurality of fixed locations.

* * * * *